(12) United States Patent
Obata

(10) Patent No.: US 9,269,488 B2
(45) Date of Patent: Feb. 23, 2016

(54) POSITION POINTER OF THE ELECTROMAGNETIC INDUCTION TYPE AND ELECTRONIC INK CARTRIDGE

(71) Applicant: Wacom Co., Ltd., Saitama (JP)

(72) Inventor: Masayuki Obata, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 182 days.

(21) Appl. No.: 13/913,042

(22) Filed: Jun. 7, 2013

(65) Prior Publication Data

US 2014/0029156 A1    Jan. 30, 2014

(30) Foreign Application Priority Data

Jul. 28, 2012 (JP) .................................. 2012-167827

(51) Int. Cl.
| | |
|---|---|
| *G06F 3/00* | (2006.01) |
| *H01F 38/00* | (2006.01) |
| *G01B 7/00* | (2006.01) |
| *G06F 3/0354* | (2013.01) |

(52) U.S. Cl.
CPC ................ *H01F 38/00* (2013.01); *G01B 7/003* (2013.01); *G06F 3/03545* (2013.01)

(58) Field of Classification Search
CPC ............................. G06F 3/03545; G01B 7/003
See application file for complete search history.

(56) References Cited

U.S. PATENT DOCUMENTS

| 5,206,785 A * | 4/1993 | Hukashima ................. 361/283.2 |
|---|---|---|
| 7,926,154 B2 | 4/2011 | Hong et al. |
| 2008/0049376 A1* | 2/2008 | Stevenson et al. ............ 361/302 |
| 2008/0149401 A1* | 6/2008 | Hagen et al. ................ 178/18.08 |
| 2008/0257613 A1* | 10/2008 | Katsurahira ................ 178/19.04 |
| 2009/0076770 A1* | 3/2009 | Fukushima et al. .......... 702/150 |
| 2009/0084614 A1* | 4/2009 | Fukushima et al. ........ 178/19.03 |
| 2009/0126174 A1 | 5/2009 | Hong et al. |
| 2011/0291999 A1* | 12/2011 | Liang et al. ................... 345/179 |
| 2013/0329335 A1 | 12/2013 | Obata |

FOREIGN PATENT DOCUMENTS

| JP | 2002244806 A | 8/2002 |
|---|---|---|
| JP | 2009124155 A | 6/2009 |
| JP | 2013254816 A | 12/2013 |

\* cited by examiner

*Primary Examiner* — Jeff Natalini
(74) *Attorney, Agent, or Firm* — Seed IP Law Group PLLC

(57) ABSTRACT

A position pointer is disclosed, in which an electronic ink cartridge of an electromagnetic induction type is accommodated. The electronic ink cartridge includes a resonance circuit having a coil and a capacitor circuit, and is configured to detect pressure applied to a core member accommodated in the position pointer based on a variation of a resonance frequency of the resonance circuit. The cartridge includes a tubular member, in which the core member and the coil are accommodated such that the coil is positioned between the core member, which extends outwardly from one end of the tubular member, and the capacitor circuit along a direction of a center axis of the tubular member. The cartridge also includes a connection member in the tubular member, which electrically connects a first end and a second end of the coil to a first terminal and a second terminal of the capacitor circuit, respectively.

16 Claims, 15 Drawing Sheets

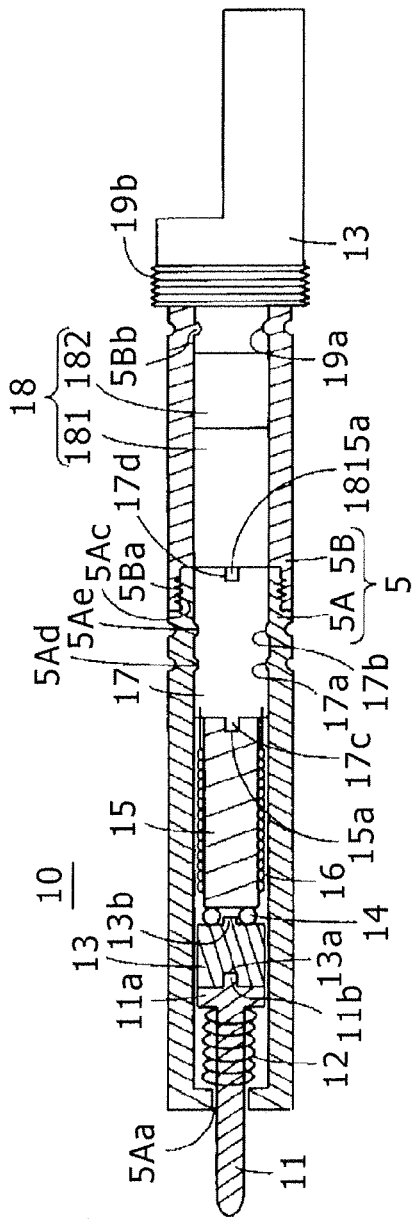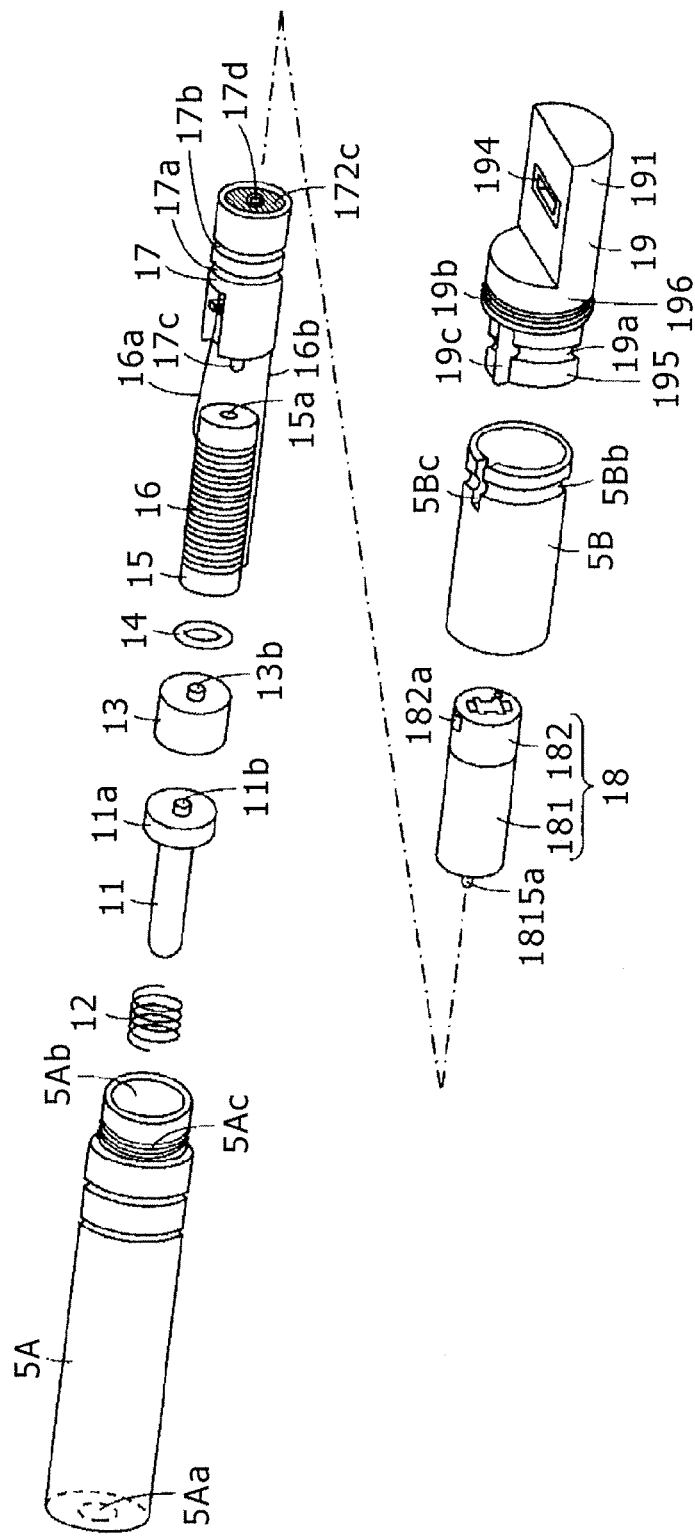
FIG. 1A
FIG. 1B

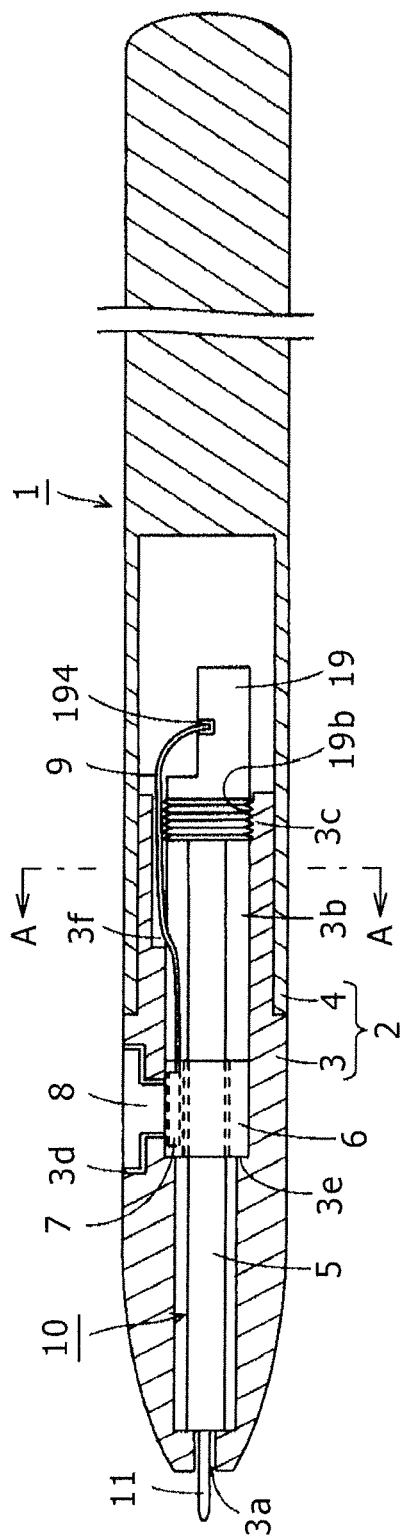
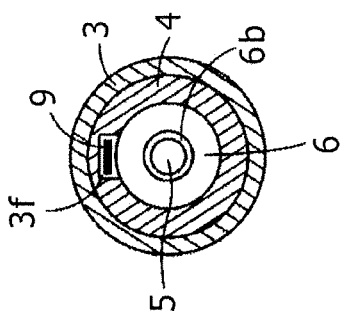
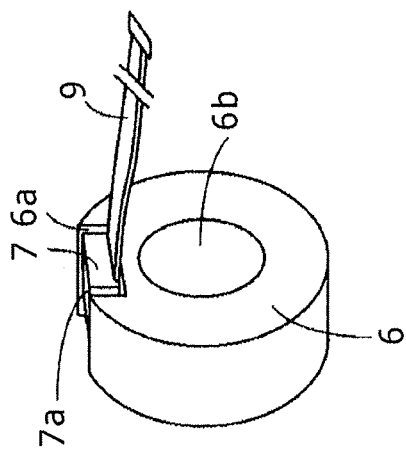

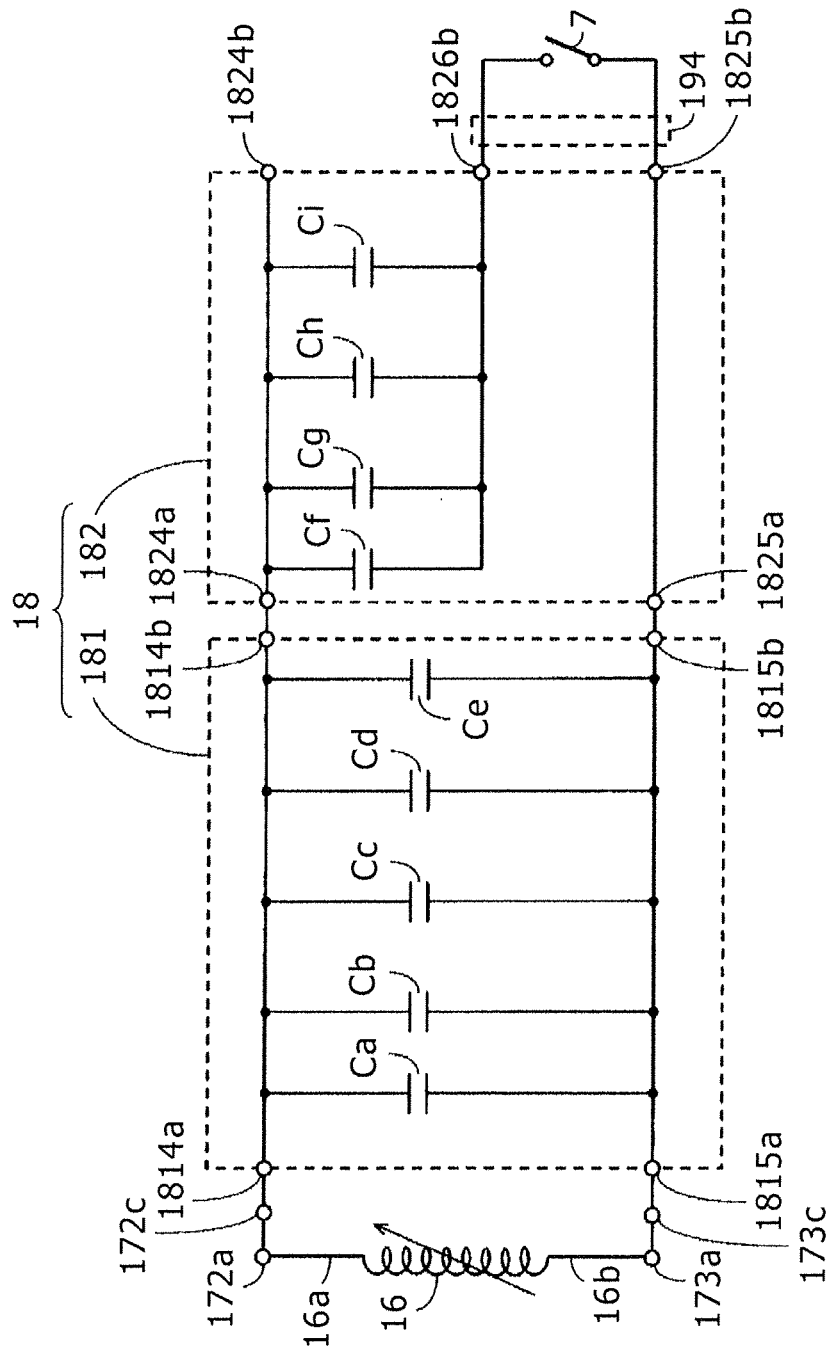

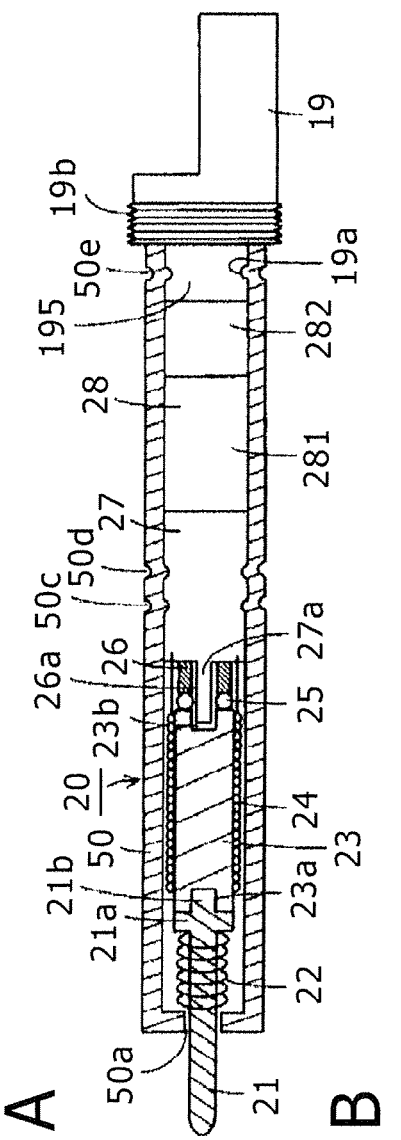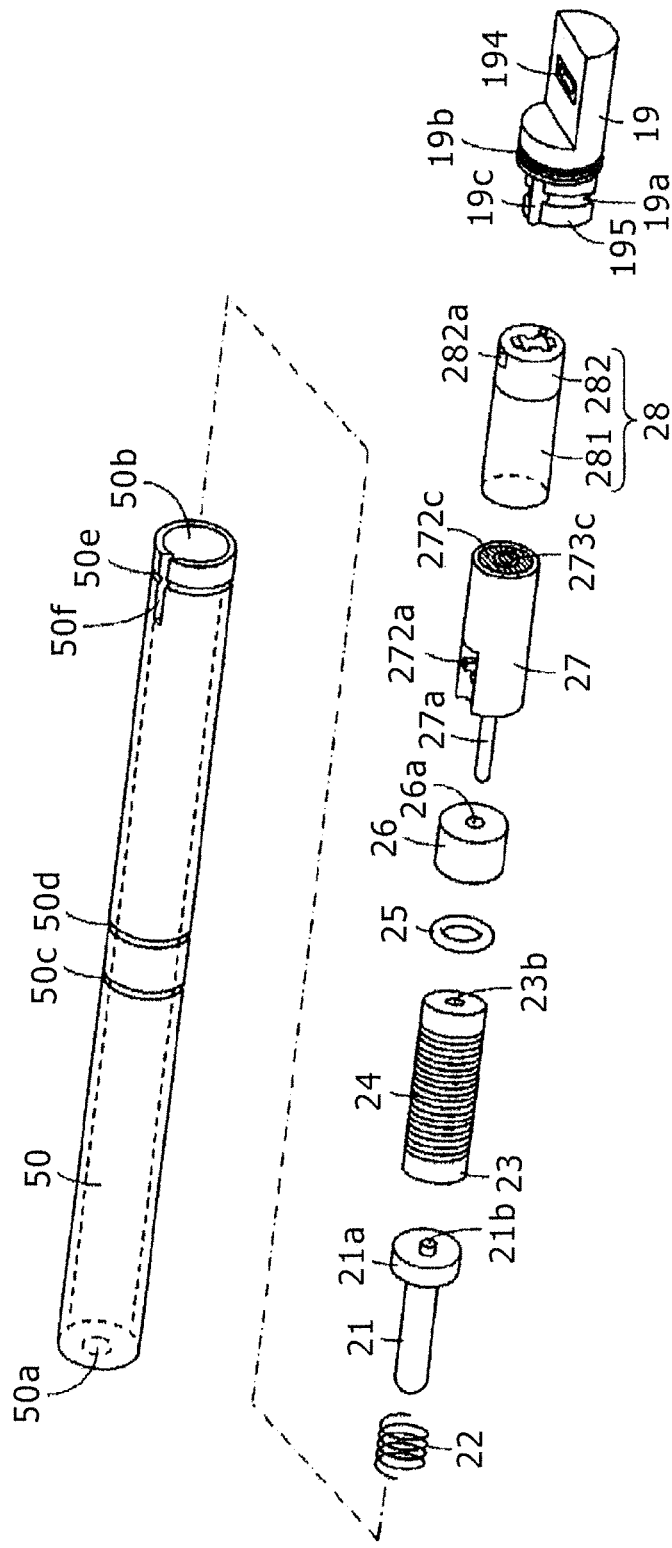
FIG.10A
FIG.10B

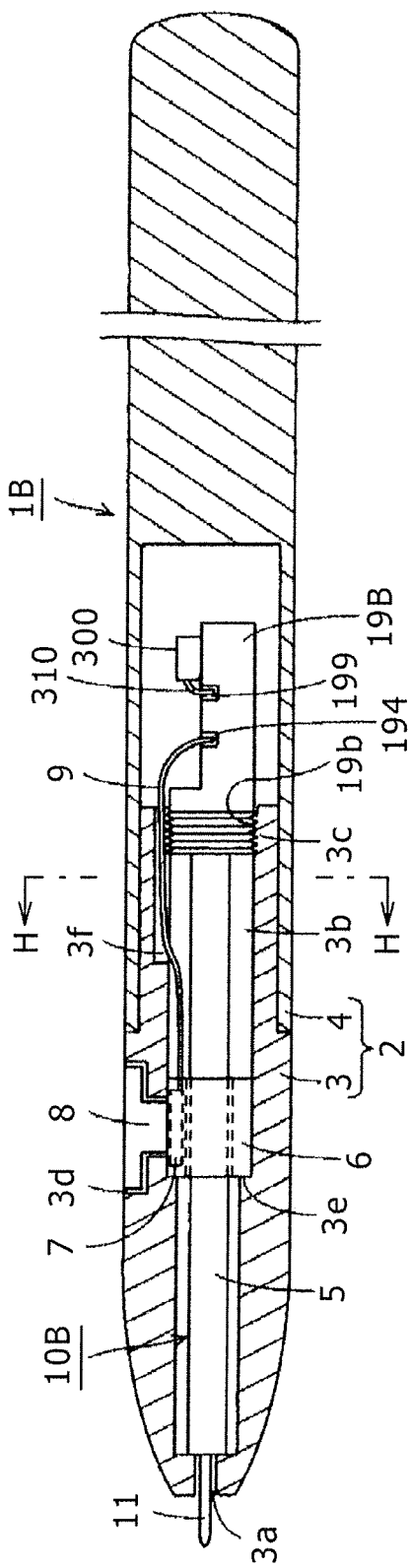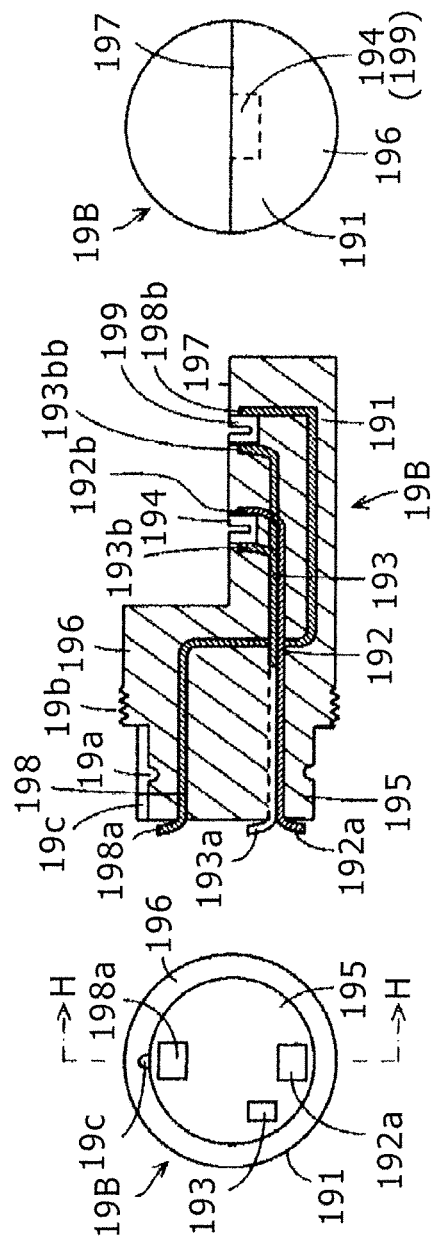

FIG.18A   FIG.18B   FIG.18C
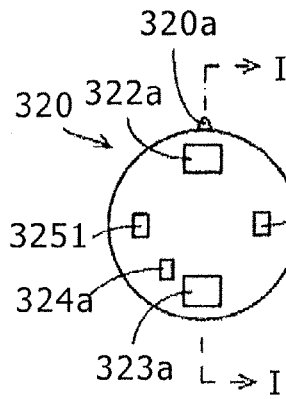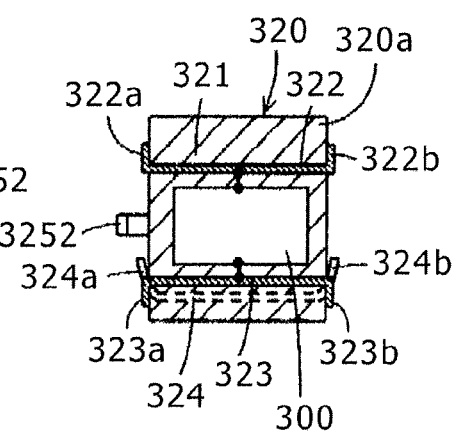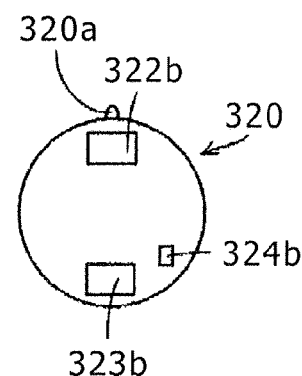
FIG.19
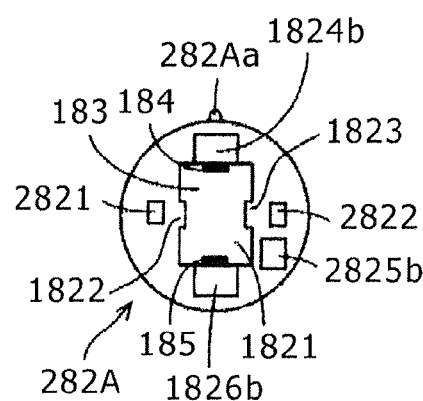

POSITION POINTER OF THE ELECTROMAGNETIC INDUCTION TYPE AND ELECTRONIC INK CARTRIDGE

CROSS-REFERENCE TO RELATED APPLICATION

The present application claims priority under 35 U.S.C. 119(a) to Japanese Patent Application No. 2012-167827, filed Jul. 28, 2012, which is incorporated by reference herein.

BACKGROUND

1. Technical Field

The present invention relates to a position pointer of the electromagnetic induction type and an electronic ink cartridge accommodated in the position pointer of the electromagnetic induction type.

2. Description of the Related Art

A coordinate inputting apparatus of the electromagnetic induction type is configured from a position detection apparatus and a position pointer of a shape of a pen as disclosed, for example, in Patent Document 1 (Japanese Patent Laid-Open No. 2002-244806). The position detection apparatus includes a sensor configured from a large number of loop coils disposed in an X-axis direction and a Y-axis direction of coordinate axes. The position pointer has a resonance circuit configured from a coil as an example of an inductance element wound around a magnetic core and a capacitor.

The position detection apparatus supplies a transmission signal of a predetermined frequency to the loop coils of the sensor, and each loop coil transmits the transmission signal as electromagnetic energy to the position pointer. The resonance circuit of the position pointer is configured such that it has a resonance frequency corresponding to the frequency of the transmission signal and cooperates with a loop coil of the sensor to store the electromagnetic energy based on an electromagnetic induction action. Then, the position pointer returns the electromagnetic energy stored in the resonance circuit to the loop coil of the sensor of the position detection apparatus.

The loop coil of the sensor detects the electromagnetic energy from the position pointer. The position detection apparatus detects coordinate values in the X-axis direction and the Y-axis direction on the sensor pointed to by the position pointer from the position of the loop coil from which the transmission signal is supplied and the position of the loop coil which detects the electromagnetic energy from the resonance circuit of the position pointer.

The position pointer of the type described has a configuration which can detect a writing pressure by the position detection apparatus when force applied to a core member of the position pointer of a shape of a pen, namely, the writing pressure, is transmitted as a variation of the resonance frequency (or phase) of the resonance circuit to the position detection apparatus. As an example of the configuration which varies the resonance frequency of the resonance circuit in response to the writing pressure, a configuration which varies the inductance of the coil which configures the resonance circuit is known. The example of Patent Document 1 is an example of a position pointer which detects the writing pressure from the variation of the inductance.

FIG. 21 is a sectional view of a related-art position pointer 100 which detects the writing pressure from a variation of the inductance. As illustrated in FIG. 21, the position pointer 100 is configured such that a ferrite core 104 on which a coil 105 is wound and a ferrite chip 102 are opposed to each other with an O ring 103 interposed therebetween such that the ferrite chip 102 moves toward the ferrite core 104 when pressing pressure (writing pressure) is applied to a core member 101. The O ring 103 used here is a ring-shaped elastic member made of an elastic material such as synthetic resin or synthetic rubber and having a cross section of a shape of the alphabetical letter "O."

In a case 111 of the position pointer 100, a printed board 114, a board holder 113, connecting wires 116 and a buffer member 117 are accommodated in addition to the parts described above. The printed board 114 has a plurality of resonant capacitors 115a to 115h disposed thereon, and the board holder 113 holds the printed board 114. The connecting wires 116 connect the coil 105 to the resonant capacitors 115a to 115h of the printed board 114 to configure a resonance circuit. The members accommodated in the case 111 are fixed at respective positions by a cap 112.

If the ferrite chip 102 against which the core member 101 configuring a pen tip abuts moves toward the ferrite core 104 in response to pressing force applied to the core member 101, then the inductance of the coil 105 wound on the ferrite core 104 varies in response to the movement of the ferrite chip 102. Thereupon, the phase (resonance frequency) of an electromagnetic induction signal transmitted from the coil 105 of the resonance circuit varies. The position detection apparatus can receive the variation of the phase (resonance frequency) of the electromagnetic induction signal from the position pointer by a loop coil thereby to detect the writing pressure applied to the core member of the position pointer.

Further, in the example of FIG. 21, the printed board 114 has a push switch 118 as a switch circuit provided thereon. The push switch 118 is switched on or off when a user presses a pressing portion thereof which is exposed to the outside of the case 111 through a through-hole (not illustrated) formed in a side wall of the case 111. The push switch 118 controls connection or disconnection of the capacitors 115e to 115h from among the resonant capacitors 115a to 115h to the resonance circuit. Accordingly, since the capacitance value of the capacitor connected in parallel in the resonance circuit is changed by switching the push switch 118 on or off, the phase (resonance frequency) of the electromagnetic induction signal transmitted from the coil of the resonance circuit to the position detection apparatus varies.

The position detection apparatus can detect an operation of the push switch 118 of the position pointer 100 by detecting the variation of the phase (frequency) of the electromagnetic induction signal from the position pointer 100 received by the loop coil. It is to be noted that the on/off operation of the push switch 118 detected by the position detection apparatus is allocated to various functions such as, for example, a determination (decision) operation input on an electronic apparatus such as a portable apparatus having the position detection apparatus built therein or a personal computer externally connected to the position detection apparatus.

PRIOR ART DOCUMENT

Patent Document

Patent Document 1
Japanese Patent Laid-Open No. 2002-244806

BRIEF SUMMARY

Problems to be Solved by the Invention

In the related-art position pointer, such component parts as the core member 101, ferrite chip 102, O ring 103, coil 105 on which the ferrite core 104 is wound, printed board 114 and board holder 113 which holds the printed board 114 are accommodated directly in a space on the inner side of the housing 111 of a tubular shape.

However, if any of the component parts accommodated in the housing 111 undergoes positional displacement in the housing 111, then this gives rise to a variation of a circuit constant, resulting in the possibility that normal use of the position pointer may be disabled. Especially, where the ferrite chip 102 and the ferrite core 104 are included, there is the possibility that a desired variation of the inductance by approaching movement of the ferrite chip 102 may not be obtained due to a variation of a circuit constant as a result of displacement of the center axes of them from each other. Therefore, if it is intended to accommodate the component parts directly into the housing as in related arts, then it is necessary to employ schemes such as to provide an offset on the inner wall face in the tubular housing 111 to restrict movement of the component parts in the direction of the center axis or to utilize the printed board 114 or the board holder 113 so as to fix the component parts in the direction of the center axis.

Further, in the case of the related-art configuration, it is necessary to adjust the resonance frequency of the resonance circuit which depends upon the coil and the capacitor after the component parts are accommodated into and positioned in the tubular housing. Therefore, the trimmer capacitors 115d and 115h provided on the printed board are adjusted through a through-hole for a button provided in the housing 111, through which the push switch 118 is to be depressed, and there is a problem that the adjustment is time-consuming.

Further, in order to assemble the position pointer, the parts described above are assembled in order in a direction of the center axis, and further, it is necessary to carry out such adjustment of the resonance frequency as described above. Therefore, the assembly is time-consuming and is not suitable for mass production.

Further, although it is demanded to make the shape of the pen thinner, if the shape of the pen is thinned with the configuration in the past, then this gives rise to a problem that increased time and labor are required for connection of the parts and an increased number of man-hours are required.

Taking the problems described above into consideration, according to one aspect, the present invention provides a position pointer of the electromagnetic induction type which is simple in part configuration in a housing and easy in adjustment and is suitable for thinning and also for mass production.

Means for Solving the Problems

In order to solve the problems described above, according to an embodiment of the present invention, an electronic ink cartridge of an electromagnetic induction type is provided. The electronic ink cartridge includes a resonance circuit, wherein the resonance circuit has a coil, whose inductance varies in response to pressure applied to a core member, and a capacitor circuit, which has predetermined capacitance and which is connected in parallel to the coil. The electronic ink cartridge is configured to detect the pressure applied to the core member based on a variation of a resonance frequency of the resonance circuit.

In the electronic ink cartridge, at least the core member and the coil are accommodated in a tubular member such that the coil is positioned between the core member, which extends outwardly from a first end of the tubular member, and the capacitor circuit along a direction of a center axis of the tubular member.

The electronic ink cartridge also includes a connection member, which electrically connects a first end and a second end of the coil to a first terminal and a second terminal of the capacitor circuit, respectively. The connection member is accommodated in the tubular member and is engaged with the tubular member in a position between the coil and the capacitor circuit.

The electronic ink cartridge further includes two connection terminals provided on one end of the connection member opposing the capacitor circuit, which are electrically connected to the first terminal and the second terminal of the capacitor circuit, respectively, to electrically connect the coil and the capacitor circuit through the connection member, to which the first end and the second end of the coil are electrically connected.

In an embodiment of the present invention having the configuration described above, the core member, the coil whose inductance varies, and the capacitor circuit which includes the capacitor that cooperates with the coil to form a resonance circuit, are arrayed in the direction of the center axis of the tubular member and are accommodated in the tubular member to configure the electronic cartridge. Accordingly, this tubular member may be accommodated in the housing to configure the position pointer of the electromagnetic induction type of the present invention.

As described above, according to an embodiment of the present invention, the electronic ink cartridge is configured such that the core member, the coil and the capacitor circuit which are component parts necessitated by the position pointer of the electromagnetic induction type are all juxtaposed in the direction of the cater axis and accommodated in the tubular member. Therefore, in the housing of the position pointer, basically it is necessary to provide only the electronic ink cartridge, and the configuration is simplified. Further, since the tubular member of the electronic ink cartridge can be readily thinned, also the position pointer as a whole can be thinned.

Further, in the electronic ink cartridge according to an embodiment of the present invention, the connection member is disposed between the coil and the capacitor circuit juxtaposed in the direction of the center axis. Further, the connection terminals provided on the end face side of the connection member opposing the capacitor circuit are electrically connected to the first terminal and the second terminal of the capacitor circuit. Consequently, the coil and the capacitor circuit are electrically connected through the connection member, to which the first end and the second end of the coil are electrically connected.

Accordingly, when the core member and the coil are accommodated into the tubular member, the connection terminals disposed on the end face of the connection member opposing the capacitor circuit are placed into a state, in which they are exposed on the opposite side of the tubular member to the core member in the direction of the center axis. The inductance of the coil disposed in the tubular member can be measured using the first and second connection terminals of the coil disposed on the end face of the connection member. Since the resonance frequency of the resonance circuit depends upon the measured inductance of the coil and the capacitance of the capacitor, the capacitance of the capacitor with respect to a desired resonance frequency can be calculated by measuring the inductance of the coil disposed in the same state as an actual use state in the tubular member.

Then, the capacitor circuit having a capacitor having desired capacitance is electrically connected to the coil through the connection member to configure a parallel resonance circuit and can be accommodated into the tubular member. Consequently, in the tubular member of the electronic ink cartridge, the core member, the coil whose inductance is variable, and the capacitor are accommodated with the resonance frequency that has already been adjusted. Then, the electronic ink cartridge is accommodated into the housing to configure the position pointer of the electromagnetic induction type of the present invention.

Accordingly, with the present invention, since the electronic ink cartridge accommodated in the housing of the position pointer is in a state in which adjustment of the resonance frequency is completed, there is no necessity to carry out adjustment of the resonance frequency after the electronic ink cartridge is accommodated into the housing. Further, in the present invention, only by accommodating the component parts in the direction of the center axis into the direction of the center axis, mechanical coupling of the component parts is established, and the first end and the second end of the coil and the first terminal and the second terminal of the capacitor are electrically connected to each other by the connection member, respectively. Therefore, according to the present invention, the electronic ink cartridge has a configuration suitable also for mass production.

Effects of the Invention

According to various embodiments of the present invention, it is only necessary to provide an electronic ink cartridge, in which the core member, the coil and the capacitor circuit, which are component parts necessary for a position pointer of the electromagnetic induction type, are juxtaposed in the direction of the center axis of the tubular member. The electronic ink cartridge is then accommodated in the housing of the position pointer. Therefore, the configuration is simplified.

Besides, with the electronic ink cartridge according to various embodiments of the present invention, since the inductance of the coil disposed in the same state as an actual use state in the tubular member can be measured, the capacitance of the capacitor with respect to a desired resonance capacitance can be calculated.

Accordingly, after the coil and the capacitor, which configure a resonance circuit, is accommodated into the housing to establish the same state as an actual use state, there is no necessity to carry out optimization of the capacitance of the capacitor for resonance to achieve a desirable resonance frequency. Therefore, the configuration provided by the present invention is suitable also for mass production. Further, since the electronic ink cartridge can be thinned, also the position pointer can be thinned as a whole.

BRIEF DESCRIPTION OF THE DRAWINGS

FIGS. 1A and 1B are views illustrating an example of a configuration of an electronic ink cartridge for a position pointer according to a first embodiment of the present invention.

FIGS. 2A-2C are views illustrating an example of a configuration of the position pointer according to the first embodiment of the present invention.

FIG. 8 is a view illustrating an equivalent circuit of the electronic ink cartridge according to the first embodiment.

FIGS. 10A and 10B are views illustrating an example of a configuration of an electronic ink cartridge for a position pointer according a second embodiment of the present invention.

FIGS. 13A-13D are views illustrating an example of a configuration of a position pointer according a third embodiment of the present invention.

FIGS. 18A-18C are views illustrating an example of a configuration of part of the electronic ink cartridge according to the fourth embodiment.

FIG. 19 is a view illustrating an example of a configuration of part of the electronic ink cartridge according to the fourth embodiment.

DETAILED DESCRIPTION

Modes for Carrying Out the Invention

First Embodiment

FIGS. 1 to 8 are views illustrating an example of a configuration of a position pointer of the electromagnetic induction type according to a first embodiment of the present invention.

Figure 21:
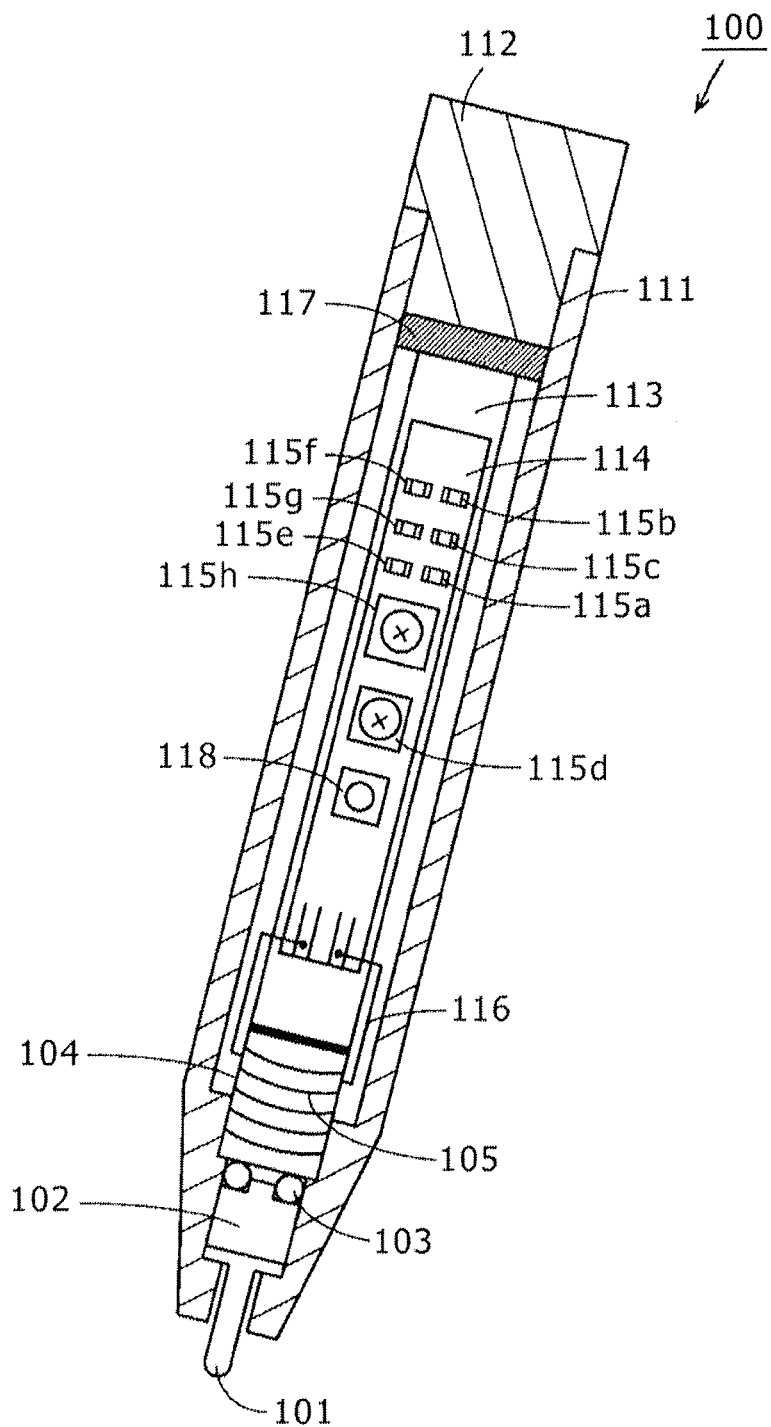
FIG. 21 is a view illustrating an example of a configuration of an example of a related-art conventional position pointer.

In the position pointer of the present first embodiment, a configuration for varying the inductance of a coil for writing pressure detection is similar to that of the related-art example described hereinabove with reference to FIG. 21. Further, the position pointer of the present first embodiment includes a push switch similarly to the related-art example described hereinabove with reference to FIG. 21 and includes a configuration for changing the resonance frequency of a resonance circuit by switching on/off of the push switch. It is to be noted that the push switch is provided on a peripheral portion of a housing at a position proximate to a core member and is also called side switch.

FIG. 2A shows an outline of a general configuration of a position pointer 1 of the present first embodiment. The position pointer 1 has a shape of a pen, and component parts of the position pointer are accommodated in an internal space in a cylindrical housing 2. In FIG. 2A, only the housing 2 of the position pointer 1 is illustrated in cross-section in order to facilitate understandings of an internal configuration of the housing 2.

The housing 2 of the position pointer 1 of the present first embodiment is configured from a cylindrical lower half 3 having an opening 3a on the pen tip side of the housing 2, and a cylindrical upper half 4 fitted with and coupled to the lower half 3 concentrically.

In the inside of the lower half 3, a hollow portion 3b having, for example, a circular sectional shape is provided, and a tubular member 5 is accommodated in the hollow portion 3b in such a state that the direction of a center axis thereof coincides with the direction of the center axis of the housing 2 as illustrated in FIG. 1. In the tubular member 5, basic component parts of the position pointer of the electromagnetic induction type, namely, a core member 11, a coil 16 having variable inductance, and a capacitor circuit 18 including a capacitor which cooperates with the coil 16 to configure a resonance circuit are accommodated. The tubular member 5 is configured from a nonmagnetic material such as nonmagnetic metal, resin material, glass or ceramics, in the present example, from SUS305, SUS310S, or the like.

In the present first embodiment, the position pointer 1 can be configured only by accommodating this tubular member 5 into the housing 2 similarly as in an ink cartridge of a ball-point pen of a writing tool. Also, it is possible to exchange the tubular member 5 with respect to the housing 2. Therefore, in the present specification, the tubular member, which accommodates therein the basic component parts of the position pointer of the electromagnetic induction type, is referred to as an electronic ink cartridge.

Example of the Configuration of the Electronic Ink Cartridge

An example of a configuration of the electronic ink cartridge 10 in the present first embodiment is described with reference to FIGS. 1 and 3 to 8. FIG. 1A is a sectional view illustrating an internal configuration of the electronic ink cartridge 10. However, for the convenience of description, some of the internal component parts of the tubular member 5 of the electronic ink cartridge 10 (a connection member 17 and a capacitor circuit 18 hereinafter described) are not illustrated in section in FIG. 1A, but a sectional view of them is prepared separately as hereinafter described. Meanwhile, FIG. 1B is an exploded perspective view illustrating a general configuration of the electronic ink cartridge 10.

The tubular member 5 in the present first embodiment is configured from a first tubular member 5A and a second tubular member 5B as two members separate from each other in the direction of the center axis. In the present example, the first tubular member 5A and the second tubular member 5B have a narrow (thin) shape such that the outer diameter thereof is, for example, 2.5 mm and the inner diameter thereof is 1.5 mm to 2 mm.

An opening 5Aa for allowing a distal end of the core member 11 to extend outwardly therethrough is provided on a first end side of the first tubular member 5A in the direction of the center axis (axial direction). The diameter of the opening 5Aa is smaller than the inner diameter of the first tubular member 5A. On the other hand, a second end side of the first tubular member 5A in the direction of the center axis is formed to have the overall inner diameter thereof as an opening 5Ab. Meanwhile, the second tubular member 5B has the overall inner diameter thereof as an opening on both of the opposite end sides thereof in the direction of the center axis.

Further, as illustrated in FIG. 1A, on the outer circumference side face of the opening 5Ab of the first tubular member 5A, a threaded portion 5Ac is formed which engages with a threaded portion 5Ba formed on an inner wall face of the opening of the second tubular member 5B on the first end side. Further, on an inner wall face of the second tubular member 5B in the proximity of the opening on the second end side, a ring-shaped protrusion 5Bb which fits with a ring-shaped grooved portion 19a formed on an outer periphery of a cap 19 made of nonmagnetic material, for example, resin, is formed, for example, by constricting the second tubular member 5B at the position. Further, at a predetermined position of the second tubular member 5B in a circumferential direction of the opening end on the second end side, a cut-out 5Bc for positioning in the circumferential direction is formed along the direction of the center axis. Further, a protrusion 19c which engages with the cut-out 5Bc of the second tubular member 5B is formed on the cap 19. The cap 19 is locked in the second tubular member 5B by forcing the protrusion 19c into the second tubular member 5B so as to be inserted into the cut-out 5Bc so that the ring-shaped grooved portion 19a and the ring-shaped protrusion 5Bb are fitted with each other.

Further, as illustrated in and FIGS. 1A and 1B, a coil spring 12, a core member 11, a ferrite chip 13 as an example of a second magnetic member, an O ring 14, a ferrite core 15 as an example of a first magnetic member on which the coil 16 is wound and the connection member 17 are accommodated in a juxtaposed relationship in this order as viewed from the opening 5Aa in the first tubular member 5A such that the center axis of the parts may coincide with each other. Further, the capacitor circuit 18 is connected to the connection member 17 in the direction of the center axis, and the second tubular member 5B is screwed with the first tubular member 5A at the threaded portions 5Ac and 5Ba thereof in a state in which the capacitor circuit 18 is accommodated. Then, the cap 19 is inserted into the second tubular member 5B and the openings of the second tubular member 5B are closed up, and the assembly of the tubular member 5 is completed therewith.

The configuration of the component parts accommodated in the inside of the tubular member 5 are described further.

The core member 11 in the present embodiment is configured, for example, from resin and has a distal end portion of a diameter extending from the opening 5Aa of the first tubular member 5A and a flange portion 11a of a diameter a little smaller than the inner diameter of the first tubular member 5A so that the flange portion 11a can move in the direction of the center axis in the first tubular member 5A. The core member 11 further has a protrusion 11b provided substantially at the center of an upper face of the flange portion 11a. The ferrite chip 13 has a cylindrical shape of a diameter a little smaller than the inner diameter of the first tubular member 5A so that it can move in the direction of the center axis in the first tubular member 5A. Further, the ferrite chip 13 has, on an end face thereof on the core member 11 side in the direction of the center axis, a recessed portion 13a into which the protrusion 11b formed on the upper face of the flange portion 11a of the core member 11 is to be fitted. Further, a protrusion 13b is formed at the center of an end face of the ferrite chip 13 on the ferrite core 15 side in the direction of the center axis such that the ferrite chip 13 and the ferrite core 15 are positioned relative to each other in the direction of the center axis.

The O ring 14 is configured from an elastic member, for example, an elastic rubber member which has an outer diameter smaller than the inner diameter of the first tubular member 5A and has an inner diameter greater than the diameter of the protrusion 13b of the ferrite chip 13. In this instance, the O ring 14 has a circular cross section having a diameter selected so as to be greater than the height of the protrusion 13b of the ferrite chip 13.

The ferrite core 15 has a cylindrical shape, and in a state in which the coil 16 is wound thereon, the diameter thereof including the coil 16 is equal to or a little smaller than the inner diameter of the first tubular member 5A. A recessed portion 15a into which a positioning protrusion 17c at a position of the center axis formed on the connection member 17 is to be fitted is formed on an end face of the ferrite core 15 on the connection member 17 side in the direction of the center axis.

The connection member 17 mechanically connects the ferrite core 15 and the capacitor circuit 18 to each other and establishes electric connection between the coil 16 wound on the ferrite core 15 and the capacitors of the capacitor circuit 18. The connection member 17 is configured from a nonmagnetic material of a cylindrical shape having an outer diameter substantially equal to the inner diameter of the first tubular member 5A, in the present example, from resin. Further, the connection member 17 is configured such that terminal members made of conductive material for establishing electric connection between the coil 16 and the capacitors of the capacitor circuit 18 are formed by insert molding in the resin of the connection member 17.

Ring-shaped recessed grooves 17a and 17b are formed at predetermined positions of an outer peripheral face of the connection member 17. Meanwhile, ring-shaped protrusions 5Ad and 5Ae are formed at positions of the first tubular member 5A, to which the ring-shaped recessed grooves 17a and 17b correspond, when the connection member 17 is accommodated therein such that they project to the inner wall face side of the first tubular member 5A. The ring-shaped protrusions 5Ad and 5Ae are formed by constricting the first tubular member 5A so that the outer peripheral face has a ring shape.

Accordingly, if the connection member 17 is inserted into the first tubular member 5A in the direction of the center axis, then the connection member 17 is locked by fitting engagement between the ring-shaped recessed grooves 17a and 17b on the outer peripheral face of the connection member 17 and the ring-shaped protrusions 5Ad and 5Ae on the inner wall face of the first tubular member 5A. Consequently, the connection member 17 is positioned in the direction of the center axis in the first tubular member 5A. It is to be noted that the ring-shaped protrusions 5Ad and 5Ae on the inner wall face of the first tubular member 5A in the present example are formed at such positions that the end face of the connection member 17 on the side on which the connection member 17 is coupled to the capacitor circuit 18 lies flush with the end face of the opening 5Ab of the first tubular member 5A.

Figure 3A:
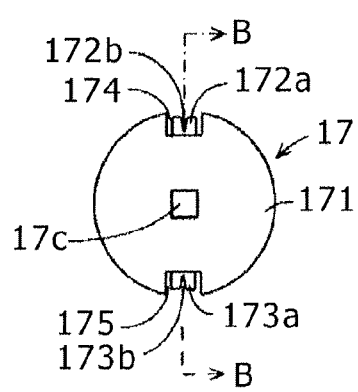
FIGS. 3A-3C are views illustrating an example of a configuration of part of the electronic ink cartridge according to the first embodiment.
Figure 3B:
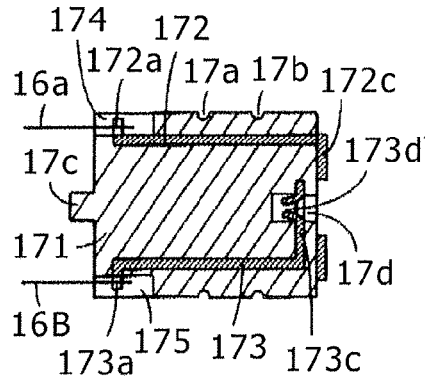
Figure 3C:
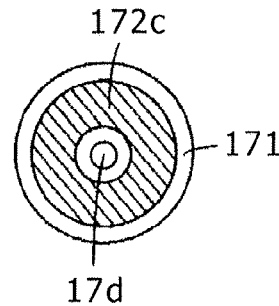

FIGS. 3A-3C are views illustrating an example of a configuration of the connection member 17. FIG. 3A is a view of the connection member 17 as viewed from the side on which the connection member 17 is connected to the ferrite core 15, and FIG. 3B is a sectional view taken along line B-B of FIG. 3A. Further, FIG. 3C is a view of the connection member 17 as viewed from the side on which the connection member 17 is connected to the capacitor circuit 18.

As illustrated in FIGS. 3A and 3B, the connection member 17 is formed by insert molding terminal members 172 and 173 formed from conductive material having elasticity for establishing electric connection between a first end 16a and a second end 16b of the coil 16 and the first end 1814a and the second end 1815a of the capacitor circuit 18 (see FIG. 5B), respectively, in a main body portion 171 formed from a cylindrical resin member.

The positioning protrusion 17c described hereinabove is formed at the center of an end face of the main body portion 171 of the connection member 17 on the ferrite core 15 side. In the present example, the protrusion 17c has a shape of a quadrangular prism.

Though not illustrated in FIGS. 3A and 3B, an end face of the ferrite core 15 and a flat face of the main body portion 171 of the connection member 17 are adhered to each other, for example, by a bonding agent in such a state that the protrusion 17c of the main body portion 171 of the connection member 17 is fitted in the recessed portion 15a of a shape corresponding to the protrusion 17c formed on the end face of the ferrite core 15.

Further, as illustrated in FIG. 3A, recessed grooves 174 and 175 are formed at positions of a peripheral side face of the main body portion 171 of the connection member 17 spaced by an angular distance of 180 degrees from each other such that they extend in the direction of the center axis of the cylindrical shape. First end portions 172a and 173a of the terminal members 172 and 173 are erected uprightly in the recessed grooves 174 and 175 in a direction perpendicular to the peripheral direction, respectively. Further, at the first end portions 172a and 173a of the terminal members 172 and 173 erected uprightly in this manner, V-shaped notches 172b and 173b are formed as illustrated in FIG. 3A.

Thus, the first end 16a of the coil 16 is press-fitted into the V-shaped notch 172b of the first end portion 172a of the terminal member 172 so as to establish electric connection therebetween as illustrated in FIG. 3B. Further, the second end 16b of the coil 16 is press-fitted into the V-shaped notch 173b at the first end portion 173a of the terminal member 173 to establish electric connection therebetween. The ferrite core 15 having the coil 16 wound thereon and the connection member 17 connected to each other in this manner can be handled as one ferrite core module. It is to be noted that the first end 16a and the second end 16b of the coil 16 are connected to the first end portions 172a and 173a of the terminal members 172 and 173 erected uprightly in the recessed grooves 174 and 175 of the connection member 17 without extending outwardly from the outer peripheral face of the connection member 17. Accordingly, the first end 16a and the second end 16b of the coil 16 are not brought into contact with the inner wall face of the first tubular member 5A.

The second end portion of the terminal member 172 of the connection member 17 is formed as a ring-shaped electrode conductor 172c at an end face thereof opposing to the end face of the capacitor circuit 18 as illustrated in and FIGS. 3B and 3C. Further, at the center of the end face of the connection member 17 opposing to the end face of the capacitor circuit 18, a recessed hole 17d is formed in a state in which it is spaced from the ring-shaped electrode conductor 172c which configures the second end portion of the terminal member 172 as illustrated in FIGS. 3B and 3C.

A second end portion 173c of the terminal member 173 of the connection member 17 is positioned in the recessed hole 17d. At the portion of the second end portion 173c of the terminal member 173 which is positioned in the recessed hole 17d, an insertion hole 173d is formed which is configured from a bent portion formed on the terminal member 173 and having elasticity. The ring-shaped electrode conductor 172c at the second end portion of the terminal member 172 and the insertion hole 173d at the second end portion 173c of the terminal member 173 configured in such a manner as described above are provided for connection between first and second terminals of the capacitor circuit 18 as hereinafter described.

Now, a configuration of the capacitor circuit 18 is described. FIGS. 4 to 6D are views illustrating an example of a configuration of the capacitor circuit 18 in the present embodiment.

Figure 4:
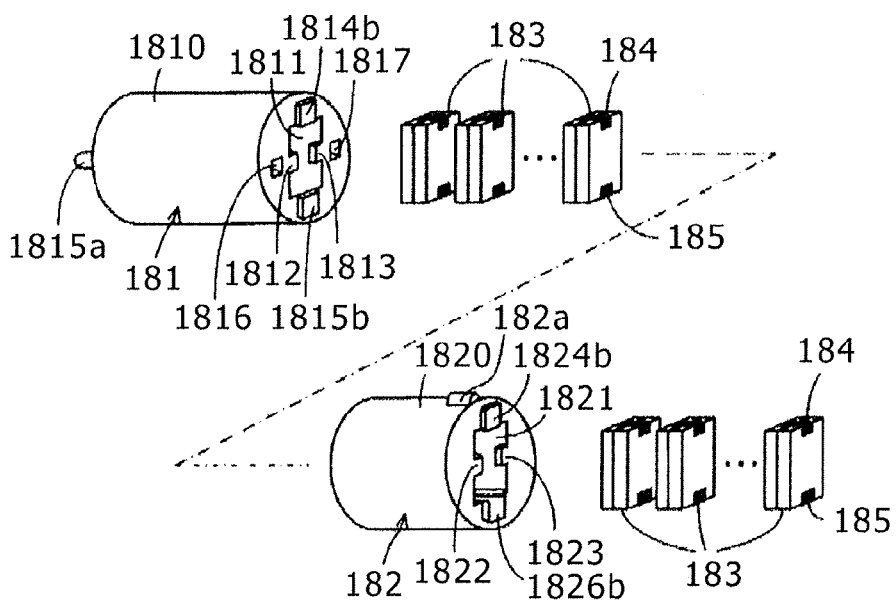
FIG. 4 is a view illustrating an example of a configuration of part of the electronic ink cartridge according to the first embodiment.

In the present first embodiment, the capacitor circuit 18 includes a configuration wherein a first capacitor circuit 181 and a second capacitor circuit 182 are coupled to each other in the direction of the center axis as illustrated in FIGS. 1A, 1B and 4. The first capacitor circuit 181 is connected, when the push switch is in one state, for example, in an off state, in parallel to the coil 16 to configure a resonance circuit. The capacitance of the first capacitor circuit 181 is adjustable in order to set the resonance frequency of the resonance circuit to a desired frequency. Meanwhile, the second capacitor circuit 182 is connected, when the push switch is in an on state, in parallel to the coil 16 and the first capacitor circuit 181 to configure a resonance circuit. The capacitance of the second capacitor circuit 182 is also adjustable in order to set the resonance frequency of the resonance circuit to a desired frequency.

The first capacitor circuit 181 and the second capacitor circuit 182 are connected in parallel to each other such that a plurality of chip capacitors 183 are stacked and accommodated in the inside of tubular holders 1810 and 1820 made of, for example, resin as illustrated in FIG. 4. A protrusion 182a is formed at a predetermined position of an outer peripheral portion of the holder 1820 of the second capacitor circuit 182 such that it extends along the direction of the center axis. The protrusion 182a is provided for positioning the second capacitor circuit 182 in a peripheral direction in the second tubular member 5B. The cut-out 5Bc is formed in the axial direction from the opening end on the second end side of the second tubular member 5B as described hereinabove. The protrusion 182a of the second capacitor circuit 182 is inserted in the cut-out 5Bc to position the second capacitor circuit 182 in the peripheral direction.

In the case of the present example, for each of the chip capacitors 183, a multilayer ceramic capacitor disclosed, for example, in Japanese Patent Laid-Open No. 2009-124155, may be used. The chip capacitor 183 of the present example is formed in a shape of a parallelepiped, and a first electrode 184 and a second electrode 185 of the chip capacitor 183 are formed in an exposed state over an overall area in the stacking direction in end faces opposing each other and extending in directions perpendicular to the stacking direction of the capacitors as indicated in solid black in FIG. 4.

Accordingly, by stacking the chip capacitors 183 in the stacking direction such that the first electrode 184 and the second electrode 185 of each of the chip capacitors 183 contact with the first electrode 184 and the second electrode 185 of another one of the chip capacitors 183, respectively, the first electrodes 184 and the second electrodes 185 of all of the stacked number of chip capacitors are connected to each other. By such connection, the chip capacitors 183 are connected in parallel to each other. In this instance, the capacitance of the first capacitor circuit 181 and the capacitance of the second capacitor circuit 182 depend upon the values and the number of the capacitance of the chip capacitors 183 accommodated in the holders 1810 and 1820, respectively.

It is to be noted that the depth of the hollow portions 1811 and 1821 of the holders 1810 and 1820, namely, the number of stacked chip capacitors 183, is set taking the degree in dispersion of the inductance of the coil 16 described hereinabove into consideration. Then, when the number of chip capacitors 183 accommodated in the hollow portions 1811 and 1821 does not satisfy a predetermined number as a result of optimization of the static capacitance by the stacking of the chip capacitors 183, in the present example, a dummy chip capacitor or capacitors having substantially very low capacitance are accommodated so that the number of chip capacitors 183 in the hollow portions 1811 and 1821 is always equal to the predetermined number as hereinafter described.

Figure 5A:
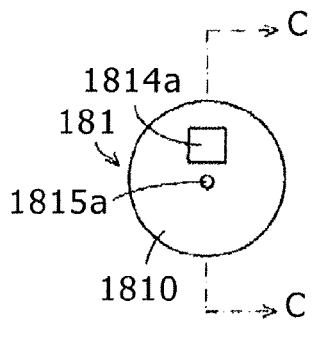
FIGS. 5A-5C are views illustrating an example of a configuration of part of the electronic ink cartridge according to the first embodiment.
Figure 5B:
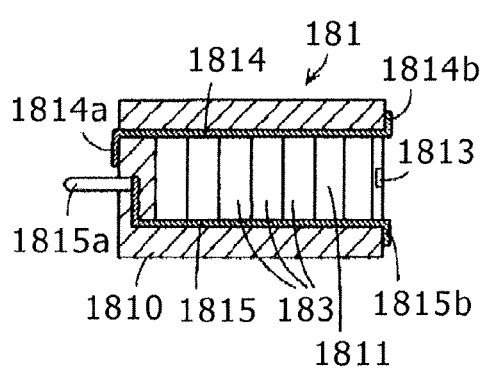
Figure 5C:
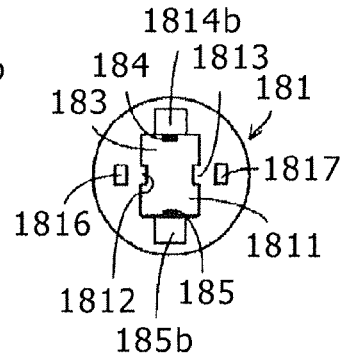
Figure 6A:
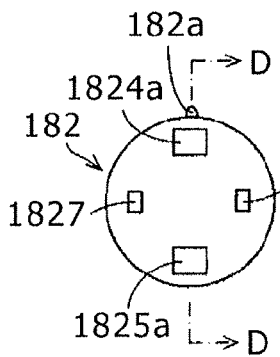
FIGS. 6A-6D are views illustrating an example of a configuration of part of the electronic ink cartridge according to the first embodiment.
Figure 6B:
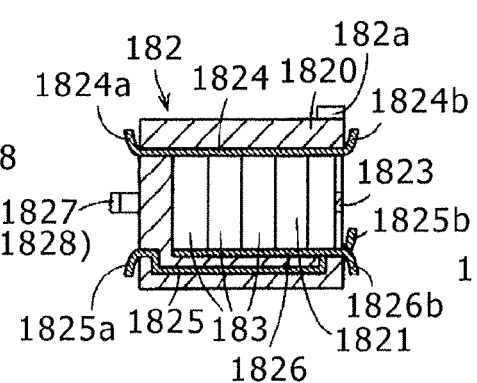
Figure 6C:
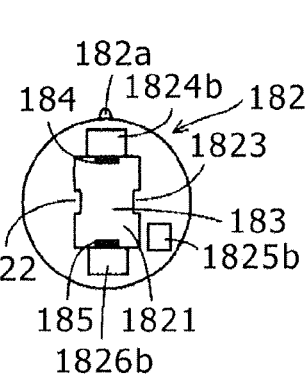

FIGS. 5A-5C illustrate an example of a configuration of the first capacitor circuit 181. FIG. 5A illustrates an end face of the first capacitor circuit 181 opposing the connection member 17, and FIG. 5B is a sectional view taken along line C-C of FIG. 5A. Further, FIG. 5C is a view illustrating an end face of the first capacitor circuit 181 opposing the second capacitor circuit 182. Meanwhile, FIGS. 6A-6D illustrate an example of a configuration of the second capacitor circuit 182. FIG. 6A is a view illustrating an end face of the second capacitor circuit 182 opposing the end face of the first capacitor circuit 181, and FIG. 6B is a sectional view taken along line D-D of FIG. 6A. Further, FIG. 6C is a view illustrating an end face of the second capacitor circuit 182 opposing the cap 19.

As illustrated in FIGS. 4, 5A-5C and 6A-6D, the holder 1810 of the first capacitor circuit 181 and the holder 1820 of the second capacitor circuit 182 have bottomed hollow portions 1811 and 1821 corresponding to the shape of the chip capacitors 183 in the direction of the center axis, respectively.

In the case of the present example, on the opening side of the hollow portions 1811 and 1821 of the holders 1810 and 1820, elastically deformable pawl portions 1812, 1813 and 1822, 1823 are formed such that they project from wall faces of the holders 1810 and 1820 opposing to each other toward the hollow portions 1811 and 1821 side, respectively. The chip capacitors 183 elastically deforms the pawl portions 1812, 1813 and 1822, 1823 to push (travel) over them until they are accommodated into the hollow portions 1811 and 1821, respectively. The pawl portions 1812, 1813 and 1822, 1823 engage with an upper face of the uppermost ones of the chip capacitors 183 accommodated in the hollow portions 1811 and 1821 to lock the chip capacitors 183 entirely in the hollow portions 1811 and 1821 including the dummy chip capacitors as occasion demands, respectively.

On the holder 1810 of the first capacitor circuit 181, paired terminal members 1814 and 1815 are provided in such a manner as to extend through the holder 1810 between the opposite end faces in the direction of the center axis as illustrated in FIG. 5B. The terminal member 1814 is provided in such a manner as to connect to the first electrode 184 of all of the chip capacitors 183 accommodated in the hollow portion 1811. Meanwhile, the terminal member 1815 is provided in such a manner as to be connected to the second electrode 185 of all of the chip capacitors 183 accommodated in the hollow portion 1811.

A first end 1814a of the terminal member 1814 is led out to the end face side opposing to the connection member 17 and is abutted with and electrically connected to the ring-shaped electrode conductor 172c at the second end portion of the terminal member 172 of the connection member 17 as illustrated in FIGS. 5A and 5B. Meanwhile, a second end 1814b of the terminal member 1814 is provided such that it is bent to the outer side with respect to the hollow portion 1811 on the end face side opposing the second capacitor circuit 182 as illustrated in FIGS. 5B and 5C.

A first end 1815a of the terminal member 1815 is led out as a rod-like member projecting from a central portion of the end face opposing the connection member 17 and is inserted into and electrically connected to the insertion hole 173d formed at the second end portion 173c of the terminal member 173 of the connection member 17 as illustrated in FIGS. 5A and 5B. Meanwhile, a second end 1815b of the terminal member 1815 is provided such that it is bent to the outer side with respect to the opening of the hollow portion 1811 on the end face side opposing the second capacitor circuit 182 as illustrated in FIGS. 5B and 5C.

On the holder 1820 of the second capacitor circuit 182, terminal members 1824 and 1825 are provided such that they extend through the holder 1820 between the opposite end faces in the direction of the center axis as illustrated in FIG. 6B. A further terminal member 1826 is provided on the holder 1820.

The terminal member 1824 is provided such that it is connected to the first electrode 184 of all of the chip capacitors 183 accommodated in the hollow portion 1821. The terminal member 1825 is provided such that it extends through the holder 1820 between the opposite end faces in the direction of the center axis without being connected to the chip capacitors 183 of the hollow portion 1821. Further, the terminal member 1826 is provided such that it is connected to the second electrode 185 of all of the chip capacitors 183 accommodated in the hollow portion 1821. However, first end of the terminal member 1826 exists in the holder 1820 and is not exposed to the outside while only the second end of the terminal member 1826 is exposed to the outside.

A first end 1824a of the terminal member 1824 is led out to the end face side opposing the first capacitor circuit 181 as illustrated in FIGS. 6A and 6B and is abutted with and electrically connected to the second end 1814b of the terminal member 1814 of the first capacitor circuit 181. Meanwhile, a second end 1824b of the terminal member 1824 is provided such that it is bent to the outer side with respect to the opening of the hollow portion 1821 on the end face side opposing the end face of the cap 19 as illustrated in FIGS. 6B and 6C.

A first end 1825a of the terminal member 1825 is led out to the end face side opposing the first capacitor circuit 181 as illustrated in FIGS. 6A and 6B and is abutted with and electrically connected to the second end 1815b of the terminal member 1815 of the first capacitor circuit 181. Meanwhile, a second end 1825b of the terminal member 1825 is provided such that it is led out and exposed to a side portion of the opening of the hollow portion 1821 on the end face side opposing the cap 19 as illustrated in FIGS. 6B and 6C.

A second end 1826b of the terminal member 1826 connected to the second electrode 185 of all of the chip capacitors 183 accommodated in the hollow portion 1821 is provided such that it is bent to the outer side with respect to the opening of the hollow portion 1821 on the end face side opposing the end face of the cap 19 as illustrated in FIGS. 6B and 6C.

Figure 6D:
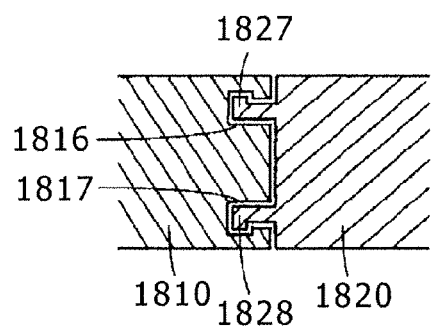

Further, on the end face of the holder 1810 of the first capacitor circuit 181 opposing the holder 1820 of the second capacitor circuit 182, fitting recessed holes 1816 and 1817 are formed as illustrated in FIG. 4 and FIG. 5C. On the end face of the holder 1820 of the second capacitor circuit 182 opposing the holder 1810 of the first capacitor circuit 181, protrusions 1827 and 1828 are formed for fitting with the fitting recessed holes 1816 and 1817 of the holder 1810 as illustrated in FIGS. 6A and 6B. In this instance, the fitting recessed holes 1816 and 1817 of the holder 1810 are bent in an L shape while the protrusions 1827 and 1828 of the holder 1820 are bent at a distal end thereof in an L shape as illustrated in FIG. 6D.

If the end faces of the holder 1810 of the first capacitor circuit 181 and the holder 1820 of the second capacitor circuit 182 are abutted with each other and the protrusions 1827 and 1828 of the holder 1820 are fitted into the fitting recessed holes 1816 and 1817 of the holder 1810, then the protrusions 1827 and 1828 of the holder 1820 are elastically deformed and inserted into the fitting recessed holes 1816 and 1817, respectively. After the fitting between the fitting recessed holes 1816 and 1817 of the holder 1810 and the protrusions 1827 and 1828 of the holder 1820 is completed, the first capacitor circuit 181 and the second capacitor circuit 182 are connected to each other such that the coupling therebetween may not be canceled readily by the bent portions thereof.

Figure 7A:
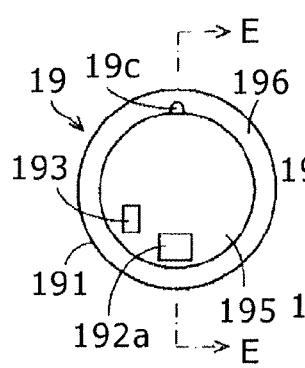
FIGS. 7A-7C are views illustrating an example of a configuration of part of the electronic ink cartridge according to the first embodiment.
Figure 7B:
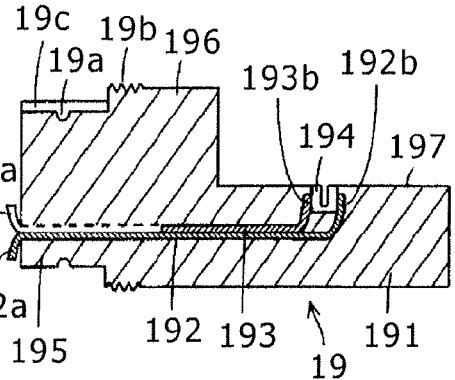
Figure 7C:
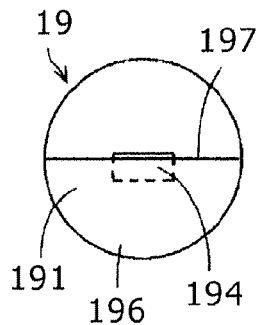

FIGS. 7A-7C show an example of a configuration of the cap 19. FIG. 7A is a view of the cap 19 as viewed from the opposing face side to the capacitor circuit 18, and FIG. 7B is a sectional view taken along line E-E of FIG. 7A. Further, FIG. 7C is a view of the cap 19 as viewed from the opposite side to the opposing face side to the capacitor circuit 18.

The cap 19 is provided such that terminal members 192 and 193 made of dielectric material are insert-molded on a main body 191 made of nonmagnetic material, in the present example, made of resin. The cap 19 includes a connector 194 with which a distal end of a flexible lead portion 9 led out from a push switch 7 hereinafter described is fitted.

As illustrated in FIG. 1 and FIG. 7C, the main body 191 of the cap 19 generally has a cylindrical shape. The opposite face side of the main body 191 to the capacitor circuit 18 is formed as a reduced diameter portion 195 having a reduced diameter to be inserted into the second tubular member 5B of the electronic ink cartridge 10. The other portion of the main body 191 is formed as an increased diameter portion 196 having a diameter greater than the outer diameter of the tubular member 5. A portion of the increased diameter portion 196 of the cap 19 on the opposite side to the opposing face side to the capacitor circuit 18 has such a shape that a cylindrical shape portion is partly cut away in the direction of the center axis. In the example of the figures, the increased diameter portion 196 is cut away at one half of the cylindrical shape portion thereof such that a flat face 197 parallel to the direction of the center axis is formed.

As described hereinabove, the ring-shaped grooved portion 19a which fits with the ring-shaped protrusion 5Bb provided on the inner wall of the opening of the second tubular member 5B is formed on the reduced diameter portion 195 of the cap 19. Further, the protrusion 19c is formed in the direction of the center axis of the cap 19 on the reduced diameter portion 195 of the cap 19 for engaging with the positioning cut-out 5Bc formed on the opening end side of the second tubular member 5B. Furthermore, a threaded portion 19b is formed on the increased diameter portion 196 of the cap 19 for threadedly engaging with a threaded portion formed on the inner wall face of the housing of the position pointer 1 as hereinafter described.

The terminal members 192 and 193 are provided to establish electric connection between the capacitor circuit 18 and the connector 194 provided on the flat face 197 formed on the increased diameter portion 196. In particular, a first end 192a of the terminal member 192 is led out such that it elastically abuts with the second end 1826b of the terminal member 1826 on the end face of the second capacitor circuit 182 on the opposing face of the reduced diameter portion 195 of the cap 19 to the capacitor circuit 18. A second end 192b of the terminal member 192 is connected to the first end of the connector 194. Meanwhile, a first end 193a of the terminal member 193 is led out such that it elastically abuts with the second end 1825b of the terminal member 1825 of the second capacitor circuit 182 on the opposing face of the reduced diameter portion 195 of the cap 19 to the capacitor circuit 18. A second end 193b of the terminal member 193 is connected to the second end of the connector 194. It is to be noted that the first end of the connector 194 is connected to a first end of the push switch 7 hereinafter described while the second end of the connector 194 is connected to a second end of the push switch 7.

An equivalent circuit to the electric circuitry including the coil 16, capacitor circuit 18 and push switch 7 of the electronic ink cartridge 10 described hereinabove is illustrated in FIG. 8. In this instance, the first end 16a and the second end 16b of the coil 16 are connected to the first end portion 172a of the terminal member 172 of the connection member 17 and the first end portion 173a of the terminal member 173, respectively.

In a state in which the first capacitor circuit 181 of the capacitor circuit 18 is coupled to the connection member 17 as described hereinabove, the first end portion 172a of the terminal member 172 of the connection member 17 is connected to the first end 1814a of the terminal member 1814 of the first capacitor circuit 181 of the capacitor circuit 18 through the ring-shaped electrode conductor 172c. Further, the first end portion 173a of the terminal member 173 of the connection member 17 is connected to the first end 1815a of the terminal member 1815 of the first capacitor circuit 181 through the second end portion 173c.

Accordingly, as illustrated in FIG. 8, the chip capacitors 183 accommodated in the first capacitor circuit 181 are connected in parallel to the coil 16. FIG. 8 illustrates a state in which capacitances Ca to Ce of the five chip capacitors 183 are connected in parallel to the inductance of the coil 16. It is to be noted that the capacitances Ca to Ce of the chip capacitors 183 may be equal to each other or may be different from each other. Since the capacitances Ca to Ce are connected in parallel, the capacitance of the entire first capacitor circuit 181 is equal to the simple sum of the capacitances of the chip capacitors 183 accommodated in the first capacitor circuit 181.

On the other hand, in a state in which the second capacitor circuit 182 is coupled to the first capacitor circuit 181, the second end 1814b of the terminal member 1814 of the first capacitor circuit 181 and the first end 1824a of the terminal member 1824 of the second capacitor circuit 182 are electrically connected to each other. Further, the second end 1815b of the terminal member 1815 of the first capacitor circuit 181 and the first end 1825a of the terminal member 1825 of the second capacitor circuit 182 are electrically connected to each other. Further, as illustrated in FIG. 8, the push switch 7 is connected between the second end 1826b of the terminal member 1826 of the second capacitor circuit 182 and the second end 1825b of the terminal member 1825 through the connector 194 of the cap 19.

Accordingly, when the second end 1826b of the terminal member 1826 and the second end 1825b of the terminal member 1825 are short-circuited, an equivalent state in which the push switch 7 is on is entered. In this state, the chip capacitors 183 accommodated in the second capacitor circuit 182 are connected in parallel to the coil 16 in addition to the chip capacitors 183 of the first capacitor circuit 181. It is to be noted that FIG. 8 illustrates a state in which capacitances Cf to Ci of the four chip capacitors 183 are accommodated in the second capacitor circuit 182 and connected in parallel to the inductance of the coil 16. Also in this state, the capacitances Cf to Ci of the chip capacitors 183 may be equal to each other or may be different from each other.

Assembly of the Electronic Ink Cartridge 10 and Adjustment of the Reference Frequency Thereof.

The electronic ink cartridge 10 is assembled in such a manner as described below. Further, by optimizing the capacitance value of each of the first capacitor circuit 181 and the second capacitor circuit 182, which configure the capacitor circuit 18, in accordance with the inductance of the coil 16, adjustment is carried out so that a desired resonance frequency may be obtained. In this instance, the assembly of the electronic ink cartridge 10 and the adjustment of the resonance frequency can be carried out automatically using an automatic machine.

Referring to FIG. 1B, the connection member 17 and the ferrite core 15 on which the coil 16 is wound are connected to each other first. In particular, the protrusion 17c for positioning at the position of the center shaft formed on the connection member 17 and the recessed portion 15a formed on the ferrite core 15 are fitted with each other. Further, the first end 16a and the second end 16b of the coil 16 wound on the ferrite core 15 are connected to the first ends 172a and 173a of the terminal members 172 and 173 provided on the connection member 17, respectively.

Then, the recessed portion 13a formed on the ferrite chip 13 and the protrusion 11b formed on the upper face of the flange portion 11a of the core member 11 are fitted with each other, and the coil spring 12 is mounted on the tip end side of the core member 11. Further, the O ring 14 is disposed around the protrusion 13b of the ferrite chip 13, and the core member 11 and the ferrite chip 13 are inserted into the hollow portion of the first tubular member 5A in the direction of the center axis from the opening 5Ab side toward the distal end on the opening 5Aa side. The core member 11 extends on the distal end side thereof outwardly from the opening 5Aa of the first tubular member 5A in a state in which it is normally biased toward the opposite side to the distal end side.

Then, the connection member 17 and the ferrite core 15 having the coil 16 wound thereon, which are connected to each other, are inserted in the direction of the center axis into the first tubular member 5A in such a manner that the ferrite core 15 is opposed to the ferrite chip 13 with the O ring 14 interposed therebetween.

At this time, the ring-shaped recessed grooves 17a and 17b on the outer peripheral face of the connection member 17 are fitted with the ring-shaped protrusions 5Ad and 5Ae provided on the inner wall face of the first tubular member 5A to lock the connection member 17 in the first tubular member 5A. In the present embodiment, since the coil spring 12 is disposed on the distal end side of the core member 11 in the hollow portion of the first tubular member 5A, the core member 11, ferrite chip 13 and O ring 14 are normally biased toward the ferrite core 15 side, on which the coil 16 is wound, by the coil spring 12. Consequently, a play of each member is prevented.

In this state, the end face of the connection member 17 on the opposite side to the joining portion to the ferrite core 15 is exposed through the opening 5Ab of the first tubular member 5A. Accordingly, the ring-shaped electrode conductor 172c of the terminal member 172 formed on the end face of the connection member 17 and the insertion hole 173d of the terminal member 173 can be contacted from the outside (refer to FIG. 3C).

In the present embodiment, in the state described above, probe terminals connected to an inductance measuring instrument are electrically contacted with the ring-shaped electrode conductor 172c of the terminal member 172 provided on the end face of the connection member 17 and the insertion hole 173d of the terminal member 173. Then, since the inductance of the coil accommodated in the first tubular member 5A can be measured in a same state as an actual use state, the capacitance of the capacitor with respect to a desired resonance frequency can be calculated by measuring the inductance of the coil. It is to be noted that the inductance of the coil 16 is that measured by the inductance measuring instrument in a state in which no pressing force is applied to the core member 11.

After the inductance of the coil 16 accommodated in the first tubular member 5A is measured in this manner, a capacitance which cooperates with the coil 16 of the inductance to configure a parallel resonance circuit to achieve a desired reference frequency is calculated. Then, a plurality of chip capacitors 183 are accommodated into the holder 1810 of the first capacitor circuit 181 so that the calculated capacitance may be obtained. At this time, if the number of chip capacitors 183 accommodated in the hollow portion 1811 of the holder 1810 is smaller than a maximum number of chip capacitors 183 which can be accommodated into the hollow portion 1811, then a dummy part or parts (dummy capacitor or capacitors) which have a shape similar to that of the chip capacitors 183 and whose capacitance is substantially equal to zero are stacked on the chip capacitors 183 so that the number of accommodated capacitors may always be equal to the prescribed number. Consequently, since an optimum number of chip capacitors 183 are accommodated in the hollow portion 1811 and the chip capacitors 183 are stacked firmly to each other, electric connection between them is assured. It is to be noted that, in the present example, the chip capacitors 183 accommodated in the holder 1810 of the first capacitor circuit 181 are locked in the hollow portion 1811 by the pawl portions 1812 and 1813 provided at the opening portion of the hollow portion 1811.

After the value of the capacitance of the first capacitor circuit 181 is set based on the measured value of the inductance so that a desired resonance frequency may be obtained, the value of the capacitance of the second capacitor circuit 182 is set. The value of the capacitance of the first capacitor circuit 181 can be set from the measured value of the inductance and a desired resonance frequency when the push switch (side switch) 7 is not operated (i.e., in one of an off state and an on state of the switch).

On the other hand, the value of the capacitance of the second capacitor circuit 182 is set in order that a desired resonance frequency is obtained when the push switch (side switch) 7 is operated (i.e., in the other of an off state and an on state of the switch). The value of the capacitance of the second capacitor circuit 182 depends on the measured value of the inductance and the value of the capacitance of the first capacitor circuit 181.

In particular, the inductance of the coil accommodated in the first tubular member 5A is measured in the same state as an actual use state. Since the resonance frequency of the resonance circuit configured from the coil 16 and the first capacitor circuit 181 is known, the value of the capacitance of the first capacitor circuit 181 can be calculated. Accordingly, as the capacitance value of the first capacitor circuit 181, a value equal to or proximate to the calculated value of the capacitance is set.

Further, since the resonance frequency after transition by operating the push switch (side switch) 7 is known, also the value of the capacitance which the second capacitor circuit 182 to be connected in parallel to the first capacitor circuit 181 should have can be calculated depending upon the measured value of the inductance and the value of the capacitance of the first capacitor circuit 181.

This is described more particularly. The inductance of the coil accommodated in the first tubular member 5A in the same state as an actual use state is represented by L1; the resonance frequency when the push switch 7 is not operated is represented by f1; the resonance frequency when the push switch 7 is operated is represented by f2; the capacitance of the first capacitor circuit 181 is represented by C1; and the capacitance of the second capacitor circuit 182 is represented by C2. In this instance, the resonance frequencies f1 and f2 are given by $f1 = (L1 \cdot C1)^{1/2}$, and $f2 = (L1 \cdot (C1+C2))^{1/2}$, respectively, and the capacitances C1 and C2 are given by $C1 = f1^2/L1$, and $C2 = f2^2/L1 - C1$, respectively.

In particular, since the resonance frequency is f1 and the inductance of the coil accommodated in the first tubular member 5A in the same state as an actual use state is measured as L1, the capacitance C1 of the first capacitor circuit 181 can be calculated. Further, if the value actually set as the capacitance of the first capacitor circuit 181 is C11 proximate to C1 by measurement of the capacitance, then the value C2 to be set as the capacitance of the second capacitor circuit 182 is calculated as $f2^2/L1 - C11$.

Assembly of the electronic ink cartridge 10 is described further. As described above, when the inductance of the coil accommodated in the first tubular member 5A in the same state as an actual use state is measured and the value of the capacitance actually set to the first capacitor circuit 181 based on the measured value of the inductance is measured, then the value of the capacitance to be set to the second capacitor circuit 182 can be calculated based on the measured value of the inductance and the value of the capacitance actually set to the first capacitor circuit 181. As the second capacitor circuit 182, a value equal or proximate to the calculated value of the capacitance is set to the second capacitor circuit 182.

The first capacitor circuit 181 and the second capacitor circuit 182 having the values of the capacitance set thereto in such a manner as described above are mechanically and electrically connected to each other as described hereinabove with reference to FIG. 6D.

It is to be noted that, as illustrated in FIG. 8 and FIG. 6C, even if the first capacitor circuit 181 and the second capacitor circuit 182 are connected to each other, the value of the capacitance of the first capacitor circuit 181 can be measured using the second end 1824b of the terminal member 1824 and the second end 1825b of the terminal member 1825 provided on the end face of the second capacitor circuit 182. Similarly, the value of the capacitance of the second capacitor circuit 182 can be measured using the second end 1824b of the terminal member 1824 and the second end 1826b of the terminal member 1826 provided on the end face of the second capacitor circuit 182. Further, the value of the capacitance of the entire circuit where the first capacitor circuit and the second capacitor circuit are connected in parallel can be measured using the second end 1824b of the terminal member 1824 and the second end 1825b of the terminal member 1825 with the second end 1825b of the terminal member 1825 and the second end 1826b of the terminal member 1826 connected to each other.

Further, as hereinafter described, if the first capacitor circuit 181 to which the second capacitor circuit 182 is connected is abutted with the end face of the connection member 17 illustrated in FIG. 3C to establish electric connection of them to the ring-shaped electrode conductor 172c and the second end portion 173c of the terminal member 173, respectively, then the resonance frequency when the push switch (side switch) 7 is operated and not operated can be measured using the second end 1824b of the terminal member 1824 and the second end 1825b of the terminal member 1825 provided on the end face of the second capacitor circuit 182.

Then, the first capacitor circuit 181 to which the second capacitor circuit 182 is connected is connected to the connection member 17. In particular, the first end 1815a of the terminal member 1815 formed as a rod-like member is inserted into the insertion hole 173d of the connection member 17 to connect the terminal member 1815 to the second end portion 173c of the terminal member 173 provided on the connection member 17 and abut and connect the first end 1814a of the terminal member 1814 with and to the ring-shaped electrode conductor 172c of the connection member 17.

In this state, the second end 1824b of the terminal member 1824, second end 1825b of the terminal member 1825 and second end 1826b of the terminal member 1826 are exposed to the open end face of the second capacitor circuit 182 (refer to FIG. 6C). Then, by contacting probe terminals of a resonance frequency measuring instrument under pressure with the second end 1824b of the terminal member 1824 and the second end 1825b of the terminal member 1825 which are exposed in such a manner as just described, then it is possible to measure the resonance frequency of the resonance circuit configured from the coil 16 and the capacitance of the first capacitor circuit 181 and confirm that the predetermined resonance frequency is obtained. Further, by short-circuiting the second end 1826b of the terminal member 1826 to the second end 1825b of the terminal member 1825 to carry out measurement, the resonance frequency when the push switch (side switch) 7 is operated can be measured.

After the confirmation of the resonance frequencies described above ends, the first capacitor circuit 181 and the second capacitor circuit 182 connected to the connection member 17 are accommodated into the hollow portion of the second tubular member 5B. Then, the threaded portion 5Ba formed on the inner wall face of the opening on the first end side of the second tubular member 5B and the threaded portion 5Ac formed on the outer circumferential side face of the opening 5Ab of the first tubular member 5A are screwed with each other to form an integral tubular member.

After the confirmation of the resonance frequency of the capacitor circuit 18 configured from the first capacitor circuit 181 and the second capacitor circuit 182 ends in such a manner as described above, the reduced diameter portion 195 of the cap 19 is inserted into the second tubular member 5B in such a manner that the protrusion 19c is engaged with the cut-out 5Bc. Consequently, the ring-shaped grooved portion 19a of the cap 19 and the ring-shaped protrusion 5Bb of the second tubular member 5B are fitted with each other to lock the cap 19 in the second tubular member 5B. At this time, the first end 1825a of the terminal member 1825 and the second end 1826b of the terminal member 1826 in the second capacitor circuit 182 are connected to the first end 193a of the terminal member 193 and the first end 192a of the terminal member 192 of the cap 19, respectively.

The electronic ink cartridge 10 is assembled in such a manner as described above. In the electronic ink cartridge 10, the resonance frequency of the parallel resonance circuit configured from the coil 16 and the capacitor circuit 18 built therein is adjusted already in both of the states in which the push switch 7 is off and on. Accordingly, in the present embodiment, when the electronic ink cartridge 10 is accommodated into the housing 2 of the position pointer 1, adjustment of the resonance frequency is not required any more.

Further, in the present first embodiment, the core member 11, the coil 16 having variable inductance (including the ferrite chip 13, O ring 14 and ferrite core 15) and the connection member 17 are accommodated in a juxtaposed state in this order in the direction of the center axis in the hollow portion of the first tubular member 5A. Further, on the end face of the connection member 17, the ring-shaped electrode conductor 172c at the second end portion of the terminal member 172 and the insertion hole 173d at the second end portion 173c of the terminal member 173, which are terminals for connection to the capacitor circuit 18 and are connected to the first end and the second end of the coil 16, are formed in a state in which they can be contacted from the outside.

Therefore, the inductance of the coil 16 in the state in which it is accommodated in the first tubular member 5A can be measured using the terminals provided on the end face of the connection member 17. Consequently, the capacitance value of the capacitor which configures a parallel resonance circuit together with the coil 16 can be calculated so as to obtain a desired value of the resonance frequency.

Further, in the embodiment described above, since the terminals connected to the first end and the second end of the coil 16 and provided on the connection member 17 are exposed from the first tubular member 5A, the position pointer can be configured only by coupling the capacitor circuit 18 to the connection member 17 such that the first and second electrodes of the capacitor circuit 18 having adjusted capacitance are connected to the terminals provided on the connection member 17 and connected to the first end and the second end of the coil 16, respectively. Therefore, the configuration is simplified significantly.

Furthermore, in the present embodiment, all of the core member 11, coil 16 having variable inductance, connection member 17 and capacitor circuit 18 are inserted in the electronic ink cartridge 10, and the electronic ink cartridge 10 is assembled in a state in which adjustment of the resonance frequency has been done already. Accordingly, the position pointer can be configured only by accommodating the electronic ink cartridge 10 into the housing of the position pointer. Therefore, the position pointer can be implemented in such a way that the electronic ink cartridge 10 accommodated therein can be handled like a replacement core of a ball-point pen.

Further, as described hereinabove, in the present embodiment, all component parts are disposed in order in the direction of the center axis in the tubular member 5 of the electronic ink cartridge 10 so as to establish not only electric connection but also mechanical coupling thereof. Therefore, there is an effect also that a thin electronic ink cartridge of such a diameter as, for example, 2.5 mm as in the case of the example described hereinabove can be implemented readily.

Accommodation of the Electronic Ink Cartridge into the Housing of the Position Pointer The electronic ink cartridge 10 of the present embodiment is mounted on the lower half 3 of the housing 2 of the position pointer 1 and accommodated into the housing 2 as illustrated in FIG. 2A. On the lower half 3 of the housing 2, the push switch 7 is provided in such a manner as described below before the electronic ink cartridge 10 is inserted.

In particular, a through-hole 3d, for example, of a circular shape or an elliptical shape is provided at part of the peripheral side face of the lower half 3, and a pressing element 8 for depressing the push switch 7 is disposed in the through-hole 3d. The pressing element 8 is made of an elastic material such as, for example, elastic rubber.

The push switch 7 is disposed in a portion 6a formed by cutting away part of a ring-shaped member 6, whose outer diameter is substantially equal to the inner diameter of the lower half 3, in a circumferential direction as illustrated in FIG. 2B. This ring-shaped member 6 has a through-hole 6b of a diameter greater than the outer diameter of the tubular member 5 of the electronic ink cartridge 10. The ring-shaped member 6 is accommodated in the hollow portion 3b of the lower half 3 so as to be positioned such that a depressed face 7a of the push switch 7 can be depressed through the pressing element 8.

In the present embodiment, a stepped portion 3e is formed by making the diameter of the hollow portion 3b of the lower half 3 on the opening 3a side a little smaller than the diameter of the other portion. The stepped portion 3e is positioned such that, as the ring-shaped member 6 is engaged with the stepped portion 3e such that the position thereof in the direction of the center axis is restricted, the depressed face 7a of the push switch 7 accommodated in the hollow portion 3b of the lower half 3 comes to the position corresponding to the pressing element 8 in the direction of the center axis.

Accordingly, the push switch 7 can be positioned by inserting the ring-shaped member 6, to which the push switch 7 is attached, to the position of the stepped portion 3e in the lower half 3 and positioning the ring-shaped member 6 in the direction of the center axis such that the depressed face 7a of the push switch 7 corresponds to the pressing element 8. After the positioning, the ring-shaped member 6 is fixed to the lower half 3, for example, by a bonding agent.

In the case of the present example, a lead portion (hereinafter referred to as flexible lead portion) 9 formed from a flexible board for electric connection is led out from the push switch 7 as illustrated in FIG. 2B. Further, a guide groove 3f is formed at part of a peripheral portion of the lower half 3 which is screwed with the cap 19 of the electronic ink cartridge 10 such that it cooperates with the cap 19 to provide an air gap therebetween as illustrated in FIG. 2C which is a sectional view taken along line A-A of FIG. 2A. The flexible lead portion 9 led out from the push switch 7 can be led out to the outside of the lower half 3 through the guide groove 3f as illustrated in FIGS. 2A and 2C.

In this manner, in the present first embodiment, the electronic ink cartridge 10 is inserted in the direction of the center axis of the lower half 3 of the housing 2 provided with the push switch 7 therein, from the side opposite to the core member 11 side. In this instance, the electronic ink cartridge 10 is inserted in the direction of the center axis of the lower half 3 through the through-hole 6b of the ring-shaped member 6 such that the core member 11 extending outwardly from the tubular member 5 extends to the outside from the opening 3a of the lower half 3 of the housing 2 as illustrated in FIG. 2A.

The opening 3a of the lower half 3 has a size greater than the diameter of the core member 11 but smaller than the diameter of the tubular member 5 of the electronic ink cartridge 10. Accordingly, the electronic ink cartridge 10 engages, on the core member 11 side of the tubular member 5 thereof, with the end portion of the inner wall of the lower half 3 on the opening 3a side to restrict the position thereof in the direction of the center axis.

Before the electronic ink cartridge 10 is inserted into the lower half 3, the flexible lead portion 9 led out from the push switch 7 is led out to the cap 19 side of the electronic ink cartridge 10 through the guide groove 3f. Then, the threaded portion 19b of the cap 19 of the electronic ink cartridge 10 is screwed into a threaded portion 3c of the lower half 3 thereby to fix the electronic ink cartridge 10 to the lower half 3.

Thereafter, a distal end of the flexible lead portion 9 led out from the push switch 7 is fitted with the connector portion 19A formed on the cap 19 of the electronic ink cartridge 10 to establish electric connection. Thereafter, the upper half 4 is press-fitted with the lower half 3 to complete the position pointer 1 of the present embodiment. In the position pointer 1 of the present embodiment, the electronic ink cartridge 10 can be removably attached to the lower half 3 and can be exchanged readily as described above. Further, the push switch 7 can be connected after the electronic ink cartridge 10 is attached to the lower half 3, and there is an advantage that also this connection can be carried out readily.

Circuit Configuration for Pointed Position Detection and Writing Pressure Detection In the position pointer 1 of the present embodiment, if pressing force (writing pressure) is applied to the core member 11, then the ferrite chip 13 is displaced toward the ferrite core 15 side through the O ring 14, whereupon the inductance of the coil 16 varies and the resonance frequency varies in response to the variation of the inductance. In other words, the resonance frequency (phase) of an electromagnetic induction signal to be transmitted from the coil 16 of the resonance circuit varies. Accordingly, if the position pointer 1 of the present example is used, then the position detection apparatus which has such a circuit configuration illustrated in FIG. 9 as described below can detect a pointed position by the position pointer 1 and the writing pressure by the position pointer 1.

Figure 9:
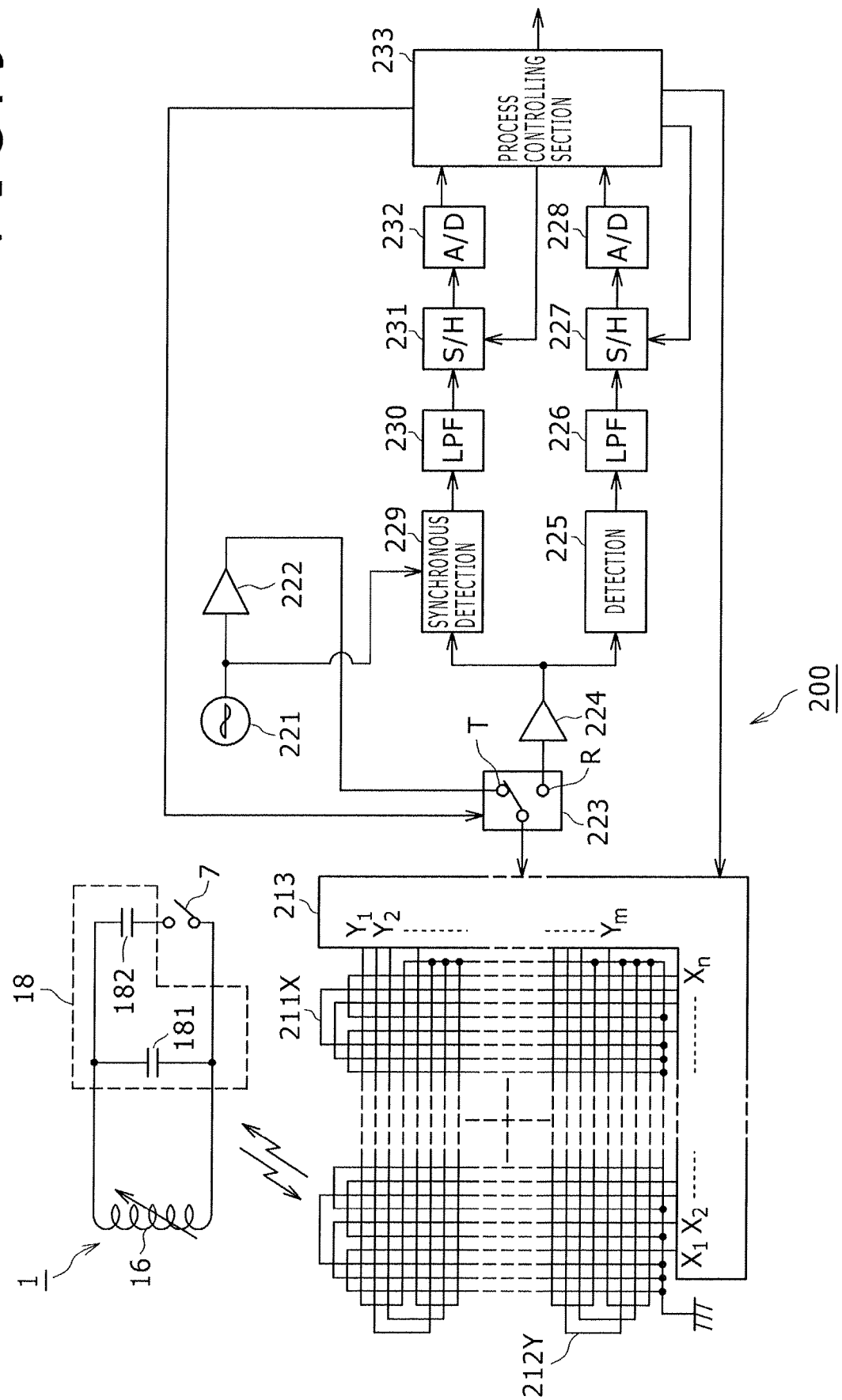
FIG. 9 is a view illustrating an equivalent circuit of the position pointer according to the first embodiment of the present invention together with a position detection apparatus.

An example of a circuit configuration of the position detection apparatus 200 which carries out detection of a pointed position and detection of writing pressure using the position pointer 1 described above is described with reference to FIG. 9. FIG. 9 is a block diagram illustrating an example of a circuit configuration of the position pointer 1 and the position detection apparatus 200.

The position pointer 1 includes the coil 16 having variable inductance, and the capacitor circuit 18 configured from the first capacitor circuit 181 and the second capacitor circuit 182. The position pointer 1 includes resonance circuits each configured from a combination of capacitance of the first capacitor circuit 181 and capacitance of the second capacitor circuit 182, and the resonance circuit of the position pointer 1 is changed over (switched) by the push switch 7 for changing over (switching) the resonance frequency.

In the position pointer 1, a capacitor circuit to be connected in parallel to the coil 16 is changed by on/off switching of the push switch 7 to change the resonance frequency of the resonance circuit as described hereinabove. In the position detection apparatus 200, a frequency displacement (phase) of the reference frequency of the reference circuit of the position pointer 1 is detected to carry out such detection of writing pressure and detection of an operation situation of the push switch 7 as hereinafter described.

In the position detection apparatus 200, an X-axis direction loop coil group 211X and a Y-axis direction loop coil group 212Y are stacked to form a position detection coil. The loop coil groups 211X and 212Y are configured, for example, from n and m rectangular loop coils, respectively. The loop coils which configure the loop coil groups 211X and 212Y are disposed in a juxtaposed relationship at equal distances from each other and in a successively overlapping relationship with each other.

The position detection apparatus 200 further includes a selection circuit 213 to which the X-axis direction loop coil group 211X and the Y-axis direction loop coil group 212Y are connected. The selection circuit 213 successively selects one of the loop coils of the two loop coil groups 211X and 212Y.

The position detection apparatus 200 further includes an oscillator 221, a current driver 222, a switch controlling circuit 223, a reception amplifier 224, a detector 225, a low-pass filter 226, a sample hold circuit 227, and an A/D conversion circuit 228. The position detection apparatus 200 further includes a synchronous detector 229, another low-pass filter 230, another sample hold circuit 231, another A/D conversion circuit 232, and a processing controlling section 233. The processing controlling section 233 is configured, for example, from a microcomputer.

The oscillator 221 generates an AC (alternating current) signal of a frequency f0. The AC signal generated by the oscillator 221 is supplied to the current driver 222 and the synchronous detector 229. The current driver 222 converts the AC signal supplied thereto from the oscillator 221 into current and transmits the current to the switch controlling circuit 223. Then switch controlling circuit 223 changes over a connection destination (a transmission side terminal T and a reception side terminal R) to which a loop coil selected by the selection circuit 213 is to be connected under the control of the processing controlling section 233. Of such connection destinations, to the transmission side terminal T and the reception side terminal R, the current driver 222 and the reception amplifier 224 are connected, respectively.

An induction voltage generated in the loop coil selected by the selection circuit 213 is sent to the reception amplifier 224 through the selection circuit 213 and the switch controlling circuit 223. The reception amplifier 224 amplifies the induction voltage supplied thereto from the loop coil and transmits the amplified induction voltage to the detector 225 and the synchronous detector 229.

The detector 225 detects an induction voltage generated in a loop coil, namely, a reception signal, and transmits the detected reception signal to the low-pass filter 226. The low-pass filter 226 has a cutoff frequency sufficiently lower than the frequency f0 described above, and converts the output signal of the detector 225 into a DC (direct current) signal and transmits the DC signal to the sample hold circuit 227. The sample hold circuit 227 holds a voltage value of the output signal of the low-pass filter 226 at a predetermined timing, particularly, at a predetermined timing within a reception period and transmits the held voltage value to the A/D (Analog to Digital) conversion circuit 228. The A/D conversion circuit 228 converts an analog output of the sample hold circuit 227 into a digital signal and outputs the digital signal to the processing controlling section 233.

On the other hand, the synchronous detector 229 synchronously detects an output signal of the reception amplifier 224 with an AC signal from the oscillator 221 and transmits a signal of a level having a phase difference between the signals to the low-pass filter 230. The low-pass filter 230 has a cutoff frequency sufficiently lower than the frequency f0, and converts the output signal of the synchronous detector 229 into a DC signal and transmits the DC signal to the sample hold circuit 231. The sample hold circuit 231 holds a voltage value of the output signal of the low-pass filter 230 at a predetermined timing and transmits the held voltage value to the A/D (Analog to Digital) conversion circuit 232. The A/D conversion circuit 232 converts an analog output of the sample hold circuit 231 into a digital signal and outputs the digital signal to the processing controlling section 233.

The processing controlling section 233 controls the components of the position detection apparatus 200. In particular, the processing controlling section 233 controls selection of a loop coil by the selection circuit 213, changeover of the switch controlling circuit 223, and timings of the sample hold circuits 227 and 231. The processing controlling section 233 controls transmission of electromagnetic induction signals with a fixed transmission duration from the X-axis direction loop coil group 211X and the Y-axis direction loop coil group 212Y based on input signals from the A/D conversion circuits 228 and 232.

In each loop coil of the X-axis direction loop coil group 211X and the Y-axis direction loop coil group 212Y, an induction voltage is generated by an electromagnetic induction signal transmitted from the position pointer 1. The processing controlling section 233 calculates coordinate values of a pointed position in the X axis direction and the Y axis direction of the position pointer 1 based on the level of the voltage values of the induction voltages generated in the respective loop coils. Further, the processing controlling section 233 detects based on the level of a signal corresponding to a phase difference between the transmitted electromagnetic induction signal and the received electromagnetic induction signal whether or not the push switch 7 is depressed.

In this manner, in the position detection apparatus 200, the position of the position pointer 1 positioned closely thereto can be detected by the processing controlling section 233. Besides, the processing controlling section 233 of the position detection apparatus 200 can detect the writing pressure applied to the core member of the position pointer 1 and detect whether or not the push switch 7 on the position pointer 1 is switched on by detecting the phase (frequency displacement) of the received signal.

In this manner, the position detection apparatus 200 detects the writing pressure and switching on of the push switch 7 by detecting the frequency displacement (phase) of the resonance frequency of the resonance circuit of the position pointer 1.

It is to be noted that, in the electronic ink cartridge of the first embodiment described above, the core member 11, coil 16 wound on the ferrite core 15 and capacitor circuit 18 are accommodated in the hollow portion of the tubular member 5. However, the capacitor circuit 18 may not be accommodated in the cylindrical member. In particular, for example, the electronic ink cartridge may be configured from the portion of the first tubular member 5A of FIG. 1 in which the core member 11 and the coil 16 wound on the ferrite core 15 are accommodated. In this instance, by forming the threaded portion 5Ac of the first tubular member 5A on the opening 5Ab side as a portion of a greater diameter than the diameter of the first tubular member 5A and screwing the threaded portion 5Ac formed in this manner with a threaded portion similar to the threaded portion 3c formed on the lower half 3 of the housing 2 similarly to the threaded portion 19b of the cap 19, the electronic ink cartridge can be locked in the housing 2.

Further, in the case of this example, since the end face of the connection member 17 is exposed on the opening 5Ab side of the first tubular member 5A of the electronic ink cartridge, the capacitor circuit 18 can be accommodated into the housing by fitting the same with the connection member 17 similarly as in the foregoing description of the embodiment described hereinabove. It is to be noted that, in this instance, the first tubular member 5A of the electronic ink cartridge may be formed longer than that in the embodiment described hereinabove such that a recessed portion is formed between the end face of the connection member 17 and the end face of the opening 5Ab of the first tubular member 5A so that part of the capacitor circuit 18 can be accommodated in the recessed portion. Further, in this instance, a ring-shaped protrusion is provided on the periphery of the portion of the capacitor circuit 18 which is accommodated in the recessed portion while a corresponding ring-shaped recessed groove is formed on the inner wall face of the hollow portion of the first tubular member 5A at the recessed portion such that, by fitting the ring-shaped projection of the capacitor circuit 18 with the ring-shaped recessed group of the first tubular member 5A, the capacitor circuit 18 can be locked to the opening 5Ab side of the electronic ink cartridge.

Second Embodiment

In the first embodiment described above, the position of the ferrite core as a first magnetic member is fixed while the ferrite chip as a second magnetic member is displaced in the direction of the center axis in response to pressing force applied to the core member to vary the distance between the ferrite core and the ferrite chip thereby to vary the inductance of the coil wound on the ferrite core in response to the pressing force.

In a second embodiment described below, a ferrite core as a first magnetic member is displaced in the direction of the center axis in response to pressing force applied to a core member to vary the distance between the ferrite core and a ferrite chip thereby to vary the inductance of a coil wound on the ferrite core in response to the pressing force.

FIGS. 10A and 10B are views illustrating an example of a configuration of an electronic ink cartridge 20 which is a principal component of the position pointer according to the second embodiment. FIG. 10A is a sectional view illustrating an internal configuration of the electronic ink cartridge 20. Also, in the present example, for the convenience of description, some of the internal component parts of a tubular member 50 of the electronic ink cartridge 20 are not illustrated in section in FIG. 10A, but a sectional view of them is prepared separately as hereinafter described. Meanwhile, FIG. 10B is an exploded perspective view illustrating a general configuration of the electronic ink cartridge 20.

It is to be noted that the configuration of the housing of the position pointer of the present second embodiment and the attachment structure of the push switch 7 to the housing are similar to those in the first embodiment, and therefore, illustration and description of them are omitted.

As illustrated in FIGS. 10A and 10B, also in the electronic ink cartridge 20, all of component parts of the position pointer of the electromagnetic induction type are accommodated in the tubular member 50. However, in the present second embodiment, the tubular member 50 is not configured as a two-part member but as a single part member. Also, the tubular member 50 in the present second embodiment has a thin shape having an outer diameter of, for example, 2.5 mm and an inner diameter of, for example, 1.5 mm to 2 mm. Further, the tubular member 50 is configured from a material of a nonmagnetic substance such as a nonmagnetic metal material, a resin material, a glass or a ceramic material, for example, from SUS305, SUS310, or the like.

On the first end side of the tubular member 50 in the direction of the center axis, an opening 50a for allowing a distal end of a core member 21 to extend outwardly therethrough is provided. The opening 50a has a diameter smaller than the inner diameter of the tubular member 50. Meanwhile, the second end side of the tubular member 50 in the direction of the center axis is formed at the entire inner diameter thereof as an opening 50b. On the opening 50b side, a groove 50f is formed for positioning in a peripheral direction such that it extends along the direction of the center axis similarly as in the case of the second tubular member 5B in the first embodiment described hereinabove.

As illustrated in FIGS. 10A and 10B, a coil spring 22, the core member 21, a ferrite core 23 as an example of a first magnetic member on which a coil 24 is wound, an O ring 25, a ferrite chip 26 as an example of a second magnetic member, a connection member 27 and a capacitor circuit 28 are accommodated in a juxtaposed relationship in this order as viewed from the opening 50a side in the tubular member 50. The parts mentioned are accommodated in such a state that the directions of the center axes thereof extend along the direction of the center axis of the tubular member 50. A cap 19 is inserted in the opening 50b of the tubular member 50 to close up the opening 50b of the tubular member 50.

It is to be noted that, in the present second embodiment, different from the case of the first embodiment, at a point of time at which the connection member 27 is accommodated to a predetermined position of the tubular member 50 in the direction of the center axis, the side peripheral face positions 50c and 50d of the tubular member 50 corresponding to a side peripheral face of the connection member 27 are constricted to form protrusions on the inner peripheral face of the tubular member 50. Thus, the connection member 27 is pressed against and held by the tubular member 50 to restrict the position of the connection member 27 so as not to move in the direction of the center axis.

On the inner wall face of the tubular member 50 in the proximity of the opening on the second end side, a ring-shaped protrusion 50e for fitting with a ring-shaped grooved portion 19a formed on an outer periphery of a reduced diameter portion 195 of the cap 19 made of a nonmagnetic material such as, for example, resin, is formed, for example, by constricting the tubular member 50 at the position. Accordingly, when the cap 19 is inserted into the tubular member 50, the ring-shaped grooved portion 19a formed on the outer periphery of the reduced diameter portion 195 of the cap 19 and the ring-shaped protrusion 50e formed on the inner wall face of the tubular member 50 are fitted with each other, thereby pressing and holding the cap 19 on the tubular member 50, so that the cap 19 is not removed from the opening 50b of the tubular member 50.

At the threaded portion 19b of the cap 19, a protrusion 19c is formed such that it is screwed with the threaded portion 3c (refer to FIG. 2A) formed on the lower half 3 of the housing 2 of the position pointer.

The configuration of the components accommodated in the inside of the tubular member 50 and assembly of the electronic ink cartridge 20 as well as adjustment of the resonance frequency are described further.

The core member 21 in the present second embodiment is configured, for example, from resin. As illustrated in FIG. 10B, the core member 21 includes a distal end portion of a shape of a rod extending outwardly from the opening 50a of the tubular member 50, and a flange portion 21a having a diameter a little smaller than the inner diameter of the tubular member 50 such that the core member 21 can move in the direction of the center axis in the tubular member 50. The core member 21 further includes a protrusion 21b substantially at the center of an upper face of the flange portion 21a.

In the present second embodiment, a recessed portion 23a for fitting with the protrusion 21b of the core member 21 is formed substantially at the center of an end face of the ferrite core 23 having the coil 24 wound thereon on the core member 21 side in the direction of the center axis. The core member 21 is positioned with the protrusion 21b thereof fitted in the recessed portion 23a of the ferrite core 23 and is adhered at the upper face of the flange portion 21a thereof to the end face of the ferrite core 23, for example, by bonding agent, so that it is coupled to the ferrite core 23.

A recessed portion 23b for positioning is formed substantially at the center of an end face of the ferrite core 23 on the opposite side to the core member 21 side in the direction of the center axis. A protrusion 27a formed on the end face of the connection member 27 is inserted into the recessed portion 23b of the ferrite core 23 through an O ring 25 made of elastic material such as, for example, rubber, and a ferrite chip 26 as illustrated in FIG. 10A. In the present example, a through-hole 26a into which the protrusion 27a of the connection member 27 is fitted is formed in the ferrite chip 26. The length of the protrusion 27a of the connection member 27 in the direction of the center axis is set to be a length over which the protrusion 27a is inserted in the recessed portion 23b of the ferrite core 23 with the O ring 25 and the ferrite chip 26 interposed therebetween and the ferrite core 23 can be displaced toward the connection member 27 in the direction of the center axis in response to pressing force applied to the core member 21.

Figures 11A, 11B, 11C:
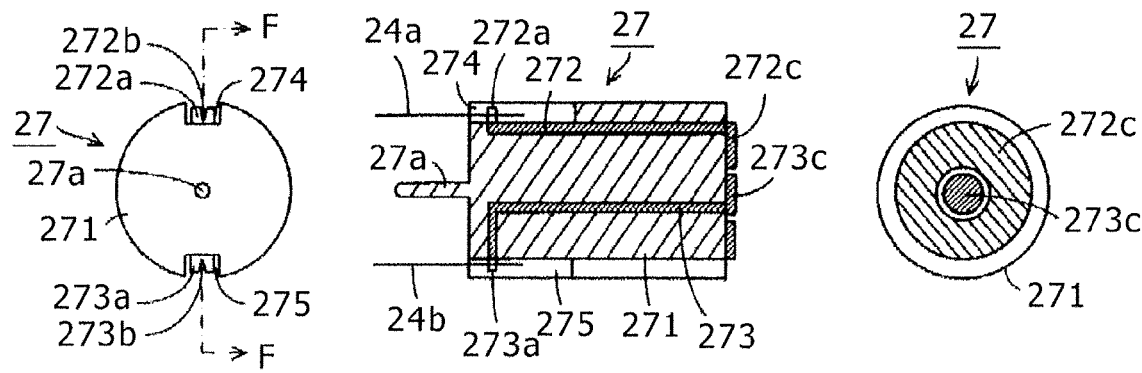
FIGS. 11A-11C are views illustrating an example of a configuration of part of the electronic ink cartridge according to the second embodiment.

FIGS. 11A-11C are views illustrating an example of a configuration of the connection member 27. FIG. 11A is a view of the connection member 27 as viewed from the side opposing the end face of the ferrite core 23, and FIG. 11B is a sectional view taken along line F-F. FIG. 11C is a view of the connection member 27 as viewed from the side on which the connection member 27 is connected to the capacitor circuit 28.

Similarly to the connection member 17 in the first embodiment, the connection member 27 is formed by insert-molding terminal members 272 and 273 having elasticity for establishing electric connection to a first end 24a and a second end 24b of the coil 24 and the first end and the second end of the capacitor circuit 28, respectively, in a main body portion 271 formed from a cylindrical resin member as illustrated in FIGS. 11A and 11B. A protrusion 27a for positioning is formed at the center of the end face of the main body portion 271 on the ferrite core 23 side. In the present example, the protrusion 27a has a shape having a circular cross section.

Further, as illustrated in FIGS. 11A and 11B, recessed grooves 274 and 275 are formed at positions spaced, in the present example, by an angular distance of 180 degrees from each other on a peripheral side face of the main body portion 271 of the connection member 27 such that they extend along the direction of the center axis of the cylindrical shape. First end portions 272a and 273a of the terminal members 272 and 273 are erected in a direction perpendicular to the peripheral direction in the recessed grooves 274 and 275, respectively. The first end portions 272a and 273a of the terminal members 272 and 273 in the erected state has V-shaped notches 272b and 273b formed thereon as illustrated in FIG. 11A. As illustrated in FIG. 11B, the first end 24a of the coil 24 is press-fitted into the V-shaped notch 272b of the first end portion 272a of the terminal member 272 to establish electric connection therebetween and the second end 24b of the coil 24 is press-fitted into the V-shaped notch 273b of the first end portion 273a of the terminal member 273 to establish electric connection therebetween.

The second end portion of the terminal member 272 of the connection member 27 is formed as a ring-shaped electrode conductor 272c on an end face thereof opposing the end face of the capacitor circuit 28 as illustrated in FIGS. 11B and 11C.

Meanwhile, the second end portion of the terminal member 273 of the connection member 27 is formed as a circular conductor 273c on the inner side of the ring-shaped electrode conductor 272c in a non-contacting relationship with the ring-shaped electrode conductor 272c at the second end portion of the terminal member 272. The ring-shaped electrode conductor 272c at the second end portion of the terminal member 272 and the circular conductor 273c at the second end portion of the terminal member 273 configured in such a manner as described above are connected to first and second terminals of the capacitor circuit 28 as hereinafter described.

In this instance, the connection of the first end 24a and the second end 24b of the coil 24 to the V-shaped notch 272b of the first end portion 272a of the terminal member 272 and the V-shaped notch 273b of the first end portion 273a of the terminal member 273 of the connection member 27 is carried out in a state in which the protrusion 27a of the connection member 27 is inserted in the recessed portion 23b of the ferrite core 23 through the through-hole 26a of the ferrite chip 26 and the through-hole of the O ring 25. Accordingly, the ferrite core 23 having the coil 24 wound thereon and the connection member 27 which are connected to each other with the O ring 25 and the ferrite chip 26 interposed therebetween can be handled as a single component part.

It is to be noted that the first end 24a and the second end 24b of the coil 24 are connected to the first end portions 272a and 273a of the terminal members 272 and 273 in the recessed grooves 274 and 275 of the connection member 27, respectively, and the first end 24a and the second end 24b of the coil 24 do not contact the inner wall face of the tubular member 50.

In the present second embodiment, the core member 21 on which the coil spring 22 is mounted is joined to the first end face of the ferrite core 23 on which the coil 24 is wound while the connection member 27 is opposed to the second end face of the ferrite core 23 with the O ring 25 and the ferrite chip 26 interposed therebetween. Further, the protrusion 27a formed on the end face of the connection member 27 is inserted in the recessed portion 23b of the ferrite core 23. In this state, the single component part described above is inserted into the hollow portion of the tubular member 50 from the opening 50b side toward the opening 50a. The core member 21 extends on the distal end side thereof outwardly from the opening 50a of the tubular member 50 in a state in which it is normally biased toward the opposite side to the distal end side by the coil spring 22.

In the present second embodiment, after the connection member 27 is inserted to a predetermined position in the direction of the center axis of the tubular member 50 at which it is pressed a little against the biasing force of the coil spring 22, the tubular member 50 is constricted at the positions 50c and 50d described hereinabove by a predetermined jig. Consequently, the connection member 27 is locked so as not to move in the direction of the center axis in the tubular member 50.

In this state, the ferrite core 23, to which the core member 21 is coupled, O ring 25 and ferrite chip 26 are normally biased toward the connection member 27 side by the coil spring 22 disposed on the distal end side of the core member 21 in the hollow portion of the tubular member 50. Consequently, backlash of the members which configure the position pointer is prevented.

At this time, the ring-shaped electrode conductor 272c and the circular conductor 273c are exposed in the tubular member 50 on the end face of the connection member 27 in the tubular member 50 on the capacitor circuit 28 side. Therefore, in the present embodiment, in order to measure the inductance of the coil 24 in this state, a measuring jig including electrode terminals for electrically connecting to the ring-shaped electrode conductor 272c and the circular conductor 273c of the connection member 27 is inserted into the tubular member 50. This measuring jig is connected to the inductance measuring instrument so that the inductance of the coil 24 in a state in which no pressing force is applied to the core member 21 is measured.

After the inductance of the coil 24 is measured, capacitance with which a desired resonance frequency may be obtained from a parallel resonance circuit configured from the coil 24 and the capacitor as described hereinabove is calculated. Then, the capacitor circuit 28 whose capacitance is set to be the calculated capacitance value is accommodated into the tubular member 50.

The capacitor circuit 28 has a circuit configuration similar to that of the capacitor circuit 18 in the first embodiment and includes a first capacitor circuit 281 and a second capacitor circuit 282. In the present second embodiment, terminal members of a shape different from that of the terminal members formed on the end face of the connection member 17 illustrated in FIGS. 3A-3C are formed. In particular, as illustrated in FIGS. 11A-11C, a ring-shaped electrode conductor 272c and a circular conductor 273c are formed on the end face of the connection member 27, and the terminal members of the first capacitor circuit 281 have a shape corresponding to the shape of the terminal members formed on the end face of the connection member 27. The configuration of the members other than the terminal members formed on the abutting faces between the connection member 27 and the first capacitor circuit 281 is quite similar to that in the first embodiment. It is to be noted that, since the second capacitor circuit 282 is configured quite similarly to the second capacitor circuit 182 in the first embodiment, description thereof is omitted herein.

Figures 12A, 12B, 12C:
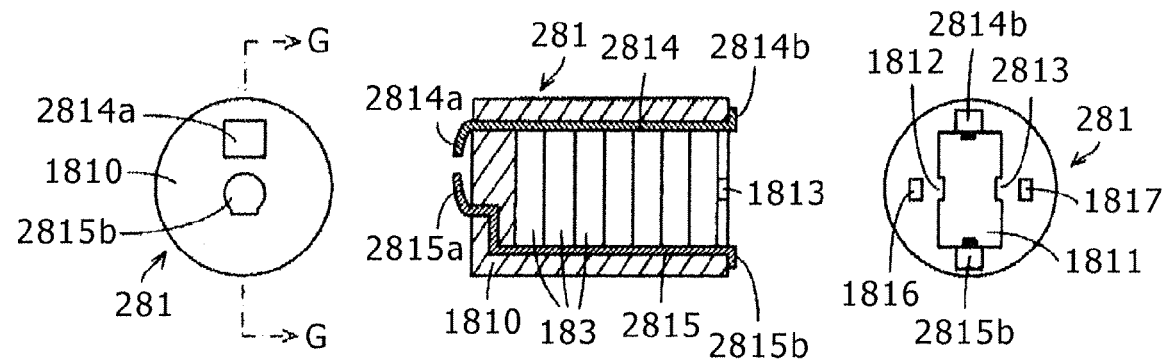
FIGS. 12A-12C are views illustrating another example of a configuration of part of the electronic ink cartridge according to the second embodiment.

FIGS. 12A-12C are views illustrating an example of a configuration of the first capacitor circuit 281 which configures the capacitor circuit 28 in the second embodiment. FIG. 12A is a view illustrating the end face side of the first capacitor circuit 281 opposing the connection member 27, and FIG. 12B is a sectional view taken along line G-G of FIG. 12A. Further, FIG. 12C is a view illustrating the end face side of the first capacitor circuit 281 opposing the second capacitor circuit 282. In these FIGS. 12A-12C, like elements to those of the first capacitor circuit 181 in the first embodiment are denoted by like reference characters, and description of them is omitted.

In particular, the first capacitor circuit 281 in the present second embodiment includes terminal members 2814 and 2815 in place of the terminal members 1814 and 1815 of the first capacitor circuit 181 described hereinabove. The terminal members 2814 and 2815 of the first capacitor circuit 281 are formed, similarly as the terminal members 1814 and 1815, such that they extend through the holder 1810 between the end face opposing to the connection member 17 and the end face opposing to the cap 19 as illustrated in FIGS. 12A and 12B. However, the first end 2814a of the terminal member 2814 has a shape corresponding to the width of the ring-shaped electrode conductor 272c of the connection member 27 and elastically abuts with the ring-shaped electrode conductor 272c. The second end 2814b of the terminal member 2814 has a configuration similar to that of the second end 1814b of the terminal member 1814. The first end 2815a of the terminal member 2815 has a circular shape and elastically abuts with the circular conductor 273c of the connection member 27. Meanwhile, the second end 2815b of the terminal member 2815 has a configuration similar to that of the second end 1815b of the terminal member 1815. The configuration of the other part is similar to that of the first capacitor circuit 181.

Also, in the present second embodiment, a capacitance value to be set to the first capacitor circuit 281 is calculated and incorporated based on the inductance of the coil 24 measured in such a manner as described hereinabove similarly as in the first embodiment. This similarly applies also to the second capacitor circuit 282 connected to the first capacitor circuit 281, and a capacitance value to be set is calculated based on the inductance of the coil 24 and the capacitance value set to the first capacitor circuit 281.

Then, the first capacitor circuit 281 and the second capacitor circuit 282 are connected to each other, and the capacitor circuit 28 to which the capacitance values are set is inserted into the tubular member 50. Thereupon, the ring-shaped electrode conductor 272c and circular conductor 273c provided on the end face of the connection member 27 locked in the tubular member 50 and the first end 2814a of the terminal member 2814 and first end 2815a of the terminal member 2815 are abutted with each other, respectively, to establish electric connection between them.

Then, as described in the first embodiment, an operation of confirming that a predetermined resonance frequency is obtained is carried out utilizing the terminals (1824b, 1825b and 1826b) provided on the open end face of the second capacitor circuit 282 and exposed to the side of the opening 50b of the tubular member 50.

It is to be noted that a protrusion 282a is formed at a predetermined position of an outer peripheral portion of the second capacitor circuit 282 such that it extends along the direction of the center axis. This protrusion 282a is provided for positioning the second capacitor circuit 282 in the peripheral direction in the tubular member 50.

After the confirmation of the resonance frequency of the capacitor circuit 28 configured from the first capacitor circuit 281 and the second capacitor circuit 282 ends in such a manner as described above, the protrusion 19c of the reduced diameter portion 195 of the cap 19 is inserted into the groove 50f formed on the tubular member 50 so that the reduced diameter portion 195 of the cap 19 is engaged with the tubular member 50. The ring-shaped grooved portion 19a formed on the outer periphery of the reduced diameter portion 195 of the cap 19 is fitted with the ring-shaped protrusion 50e formed on the inner wall face in the proximity of the opening on the second end side of the tubular member 50 in such a state that the capacitor circuit 28 is pressed a little by the cap 19.

The electronic ink cartridge 20 is assembled in such a manner as described above. In the present electronic ink cartridge 20, when pressing force in the direction of the center axis is applied to the core member 21, the ferrite core 23 is displaced toward the ferrite chip 26 side through the O ring 25 to vary the distance between the ferrite core 23 and the ferrite chip 26 thereby to vary the inductance of the coil 24. Then, the resonance frequency (phase) of the electromagnetic induction signal transmitted from the coil 24 of the resonance circuit of the position pointer varies in response to the variation of the inductance of the coil 24 similarly as in the first embodiment. Consequently, the pointed position by the position pointer and the writing pressure can be detected.

Then, the electronic ink cartridge 20 is accommodated into the housing 2 similarly to the electronic ink cartridge 10 in the first embodiment. In particular, the flexible lead portion 9 led out from the push switch 7 is led out to the cap 19 side of the electronic ink cartridge 20 through the guide groove 3f as illustrated in FIG. 2. Then, the threaded portion 19b formed on the cap 19 of the electronic ink cartridge 20 is screwed with the threaded portion 3c of the lower half 3 to fix the electronic ink cartridge 20 to the lower half 3. Thereafter, a distal end of the flexible lead portion 9 led out from the push switch 7 is fitted with the connector portion 194 formed on the cap 19 of the electronic ink cartridge 20 to establish electric connection therebetween. Thereafter, the upper half 4 is press-fitted into the lower half 3 to complete the position pointer 1 of the present embodiment.

The position pointer of the present second embodiment achieves working operations quite similar to those achieved by the first embodiment described hereinabove while only it is different in configuration for varying the inductance of the coil for writing pressure detection from that of the first embodiment.

Third Embodiment

In the position pointers of the embodiments described above, a parallel resonance circuit configured from a coil and a capacitor is used to transmit and receive an electromagnetic induction signal to and from a position detection apparatus so that a pointed position by a pointer and writing pressure by the position pointer can be detected by the position detection apparatus. However, by providing a signal processing circuit on the position pointer, for example, identification information (ID) of the position pointer or an electronic ink cartridge can be transmitted as information relating to the position pointer or the electronic ink cartridge to the position detection apparatus. The identification information (ID) is an example of information relating to an electronic ink cartridge. As this identification information, information which specifies a manufacturer, a product number, a production date, a production lot number, a position detection method such as an electromagnetic induction method or a capacitive method, a writing pressure detection method based on an inductive variation or a capacitive variation and so forth, of an electronic ink cartridge or a position pointer is registered into a semiconductor device such as a memory or a register.

The third embodiment provides a position pointer 1B which transmits identification information of an electronic ink cartridge to a position detection apparatus. FIGS. 13A-13D are views illustrating an example of a configuration of the position pointer 1B of the third embodiment. The position pointer 1B of the present third embodiment includes an electronic ink cartridge 10B having a configuration similar to that of the electronic ink cartridge 10 in the first embodiment described hereinabove and further includes an ID transmission circuit 300 as an information transmission circuit.

The electronic ink cartridge 10B in the present third embodiment is configured such that it includes a cap 19B having a configuration different from that of the cap 19 in the first embodiment and the ID transmission circuit 300 is connected to the cap 19B. FIG. 13A shows an example of a configuration of the position pointer 1B corresponding to the configuration of the position pointer 1 in the first embodiment illustrated in FIG. 2A. FIGS. 13B to 13D are views illustrating a configuration of the cap 19B of the electronic ink cartridge 10B and corresponding to the example of the configuration of the cap 19 of FIGS. 7A to 7C in the first embodiment. In FIG. 13, like components to those in the first embodiment illustrated in FIGS. 2A-2C and 7A-7C are denoted by like reference characters and detailed description of them is omitted.

As illustrated in FIGS. 13B to 13D, the cap 19B of the electronic ink cartridge 10B in the third embodiment includes a terminal member 198 in addition to the terminal members 192 and 193. A first end 198a of the terminal member 198 is configured such that it is exposed to the end face side of the cap 19B which abuts with an end face of the second capacitor circuit 182 of the capacitor circuit 18, and that the first end 198a abuts, for example, with the second end 1824b of the terminal member 1824 of the second capacitor circuit 182 illustrated in FIGS. 6A-6D to establish electric connection.

On the flat face 197 of the cap 19B, a connector 199 having two terminals for the connection to the ID transmission circuit 300 is formed in addition to the connector 194 as illustrated in FIGS. 13A and 13C. The second end of the terminal member 198 is connected to a first terminal 198b of the two terminals of the connector 199 as illustrated in FIG. 13C. Further, the terminal member 193 is connected to the second end 193b of the connector 194 and connected to a second end 193bb of the connector 199 as illustrated in FIG. 13C. Accordingly, the ID transmission circuit 300 is connected in parallel to a resonance circuit configured from the coil 16 and the capacitor circuit 18.

Meanwhile, the ID transmission circuit 300 includes a lead portion 310 for connecting to the connector 199 provided on the cap 19B. As illustrated in FIG. 13A, the ID transmission circuit 300 is placed on the flat face 197 of the cap 19B, and the lead portion 310 thereof is connected to the connector 199 of the cap 19B. Thus, when the electronic ink cartridge 10B is mounted in the housing 2 of the position pointer 1B, the ID transmission circuit 300 is accommodated in a space formed between the cap 19B and the hollow portion of the upper half 4 of the housing 2 as illustrated in FIG. 13A.

Figure 14:
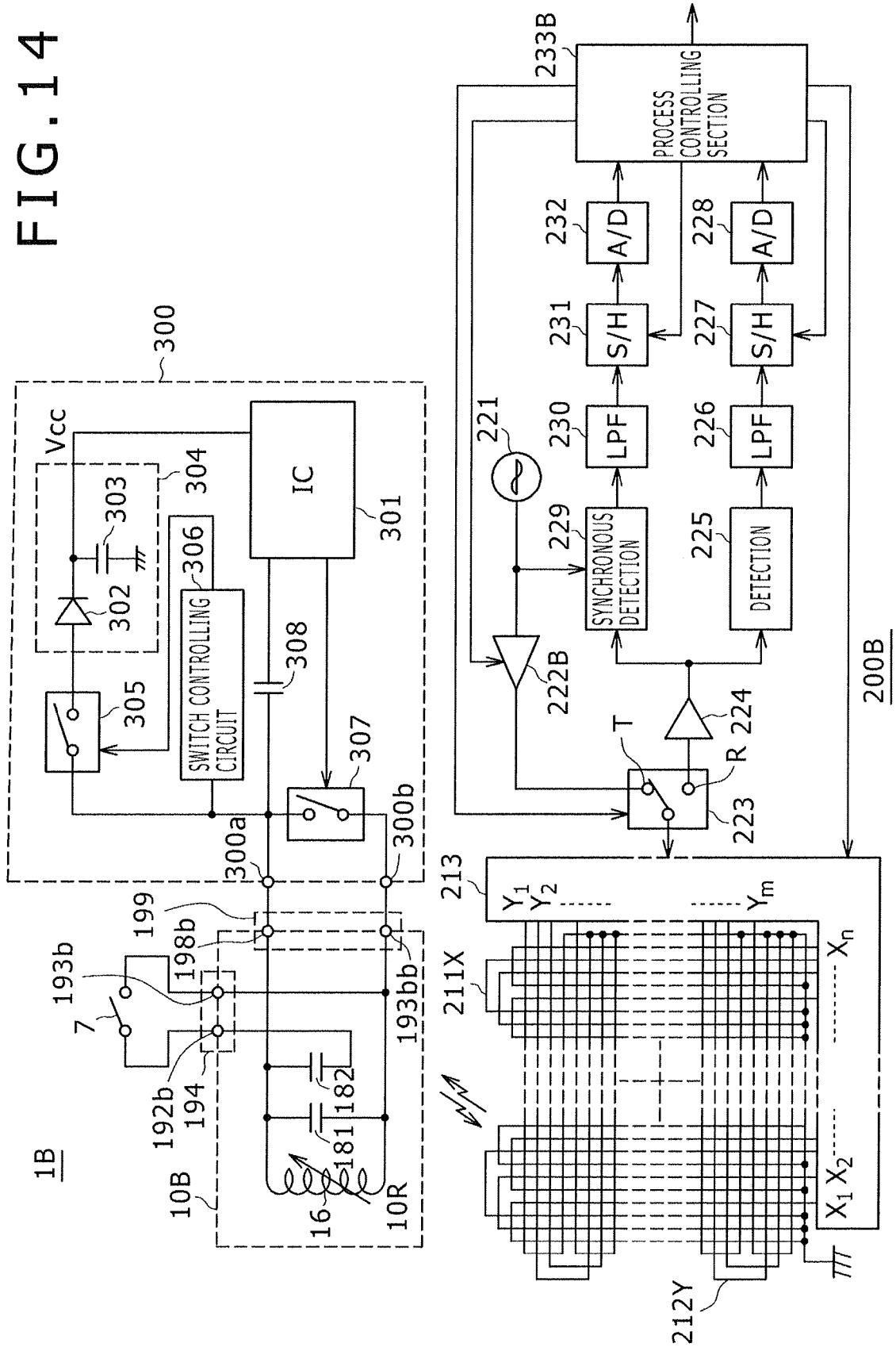
FIG. 14 is a view illustrating an equivalent circuit of the position pointer according to the third embodiment of the present invention together with a position detection apparatus.

FIG. 14 is a view illustrating a circuit configuration of the position pointer 1B and a position detection apparatus 200B where the configuration wherein identification information (ID) of a position pointer or an electronic ink cartridge is transmitted to the position detection apparatus is adopted. In FIG. 14, the electronic ink cartridge 10B is illustrated as a parallel resonance circuit 10R wherein the first capacitor circuit 181 is connected in parallel to the coil 16 whose inductance varies in response to the writing pressure and to which a series circuit of the second capacitor circuit 182 and the push switch 7 is connected in parallel. The push switch 7 is connected to the connector 194 of the cap 19 of the electronic ink cartridge 10 as illustrated in FIGS. 2A-2C.

It is needless to say that as the parallel resonance circuit 10R, a parallel resonance circuit where the configuration of the electronic ink cartridge 20 in the second embodiment is adopted can be used similarly.

The two terminals 198b and 193bb of the connector 199 are connected to the first end and the second end of the coil 16, respectively. The two terminals 198b and 193bb of the connector 199 are connected to two terminals 300a and 300b of the ID transmission circuit 300, respectively.

The ID transmission circuit 300 of the position pointer 1B includes an IC (Integrated Circuit) 301 as an ID generation controlling circuit as illustrated in FIG. 14. This IC 301 is configured such that it operates by a power supply Vcc obtained by rectifying an AC signal received by the parallel resonance circuit 10R through an electromagnetic coupling from the position detection apparatus 200B by a rectification circuit (power supply circuit) 304 configured from a diode 302 and a capacitor 303. In the present example, a switch circuit 305 which normally exhibits an open state (is normally open) is provided between the connector 199 and the power supply circuit 304. The switch circuit 305 is configured, for example, from a semiconductor switch circuit and exhibits, in its open state, a high impedance state.

The switch circuit 305 is controlled so that it is switched on by a switch controlling signal from a switch controlling circuit 306. The switch controlling circuit 306 generates a switch controlling signal from an AC signal received by the parallel resonance circuit 10R through electromagnetic coupling from the position detection apparatus 200B.

Further, in the ID transmission circuit 300, a switch circuit 307 is connected in parallel to the parallel resonance circuit 10R configured from the coil 16 and the capacitor circuit 18 (181 and 182). The switch circuit 307 is configured so as to be controlled between on and off by the IC 301.

The IC 301 in the present example stores a manufacturer's number and a product number of the position pointer 1B or the electronic ink cartridge 10B and controls the switch circuit 307 between on and off to transmit an ID signal including the manufacturer's number and the product number, for example, as a digital signal of eight bits to the position detection apparatus 200B.

On the other hand, the position detection apparatus 200B of the example of FIG. 14 is configured such that it includes a current driver 222B, whose gain can be variably adjusted by a gain controlling signal from the outside, in place of the current driver 222 whose gain is fixed in the configuration of the position detection apparatus 200 illustrated in FIG. 9. The position detection apparatus 200B is further configured such that it includes a processing controlling section 233B in place of the processing controlling section 233. The other components of the position detection apparatus 200B are quite similar to those of the position detection apparatus 200 described hereinabove with reference to FIG. 9.

The current driver 222B is configured such that it receives a gain controlling signal from the processing controlling section 233B to vary the signal level of the transmission signal.

Further, the processing controlling section 233B is configured, for example, from a microcomputer. The processing controlling section 233B transmits and receives an electromagnetic induction signal to and from the position pointer 1B to carry out detection of a position pointed to by the position pointer 1B and detection of writing pressure applied to the position pointer 1B similarly to the processing controlling section 233. In addition, the processing controlling section 233B supplies a signal for controlling the transmission signal between on and off and another signal for controlling the level of the transmission signal and carries out a reception process of an ID signal from the position pointer 1B. The processing controlling section 233B detects the on/off signal from the position pointer 1B as a digital signal of several bits, for example, eight bits, to detect an ID signal as hereinafter described.

Figure 15:
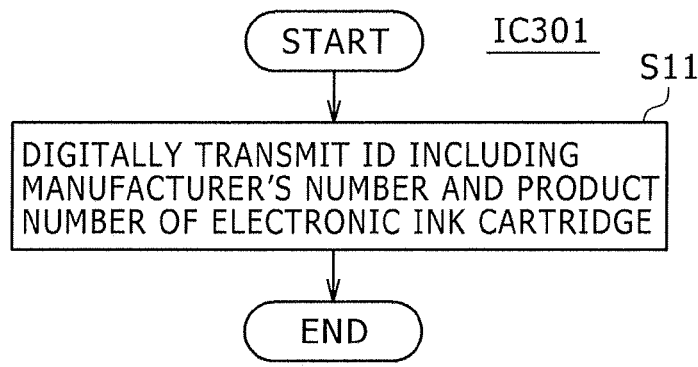
FIG. 15 is a view illustrating a flow chart illustrating processing operation of the position pointer of the embodiment of FIG. 14.

In the following, transmitting and receiving of an ID signal between the position pointer 1B and the position detection apparatus 200B and a position detection operation and a writing pressure detection operation are described. FIG. 15 is a flow chart illustrating processing operation of the IC 301 of the position pointer 1B. As hereinafter described, the process is started when the switch circuit 305 is switched on and the power Vcc is supplied from the power supply circuit 304 to the IC 301.

In a state in which the switch circuit 305 is off and the power Vcc is not supplied from the power supply circuit 304 to the IC 301, operation of the IC 301 is stopped. At this time, when viewed from the connector 199, the ID transmission circuit 300 exhibits a high impedance state, and this is equivalent to a state in which nothing is connected to the connector 199. Accordingly, at this time, a capacitance component is not connected in parallel to the parallel resonance circuit 10R, and the resonance frequency of the parallel resonance circuit 10R is not influenced by the ID transmission circuit 300. It is to be noted that an electromagnetic induction signal transmitted from the position detection apparatus 200B is supplied as a synchronizing signal for providing and receiving of an electromagnetic induction signal to and from the position detection apparatus 200B to the IC 301 through a capacitor 308.

Figure 16:
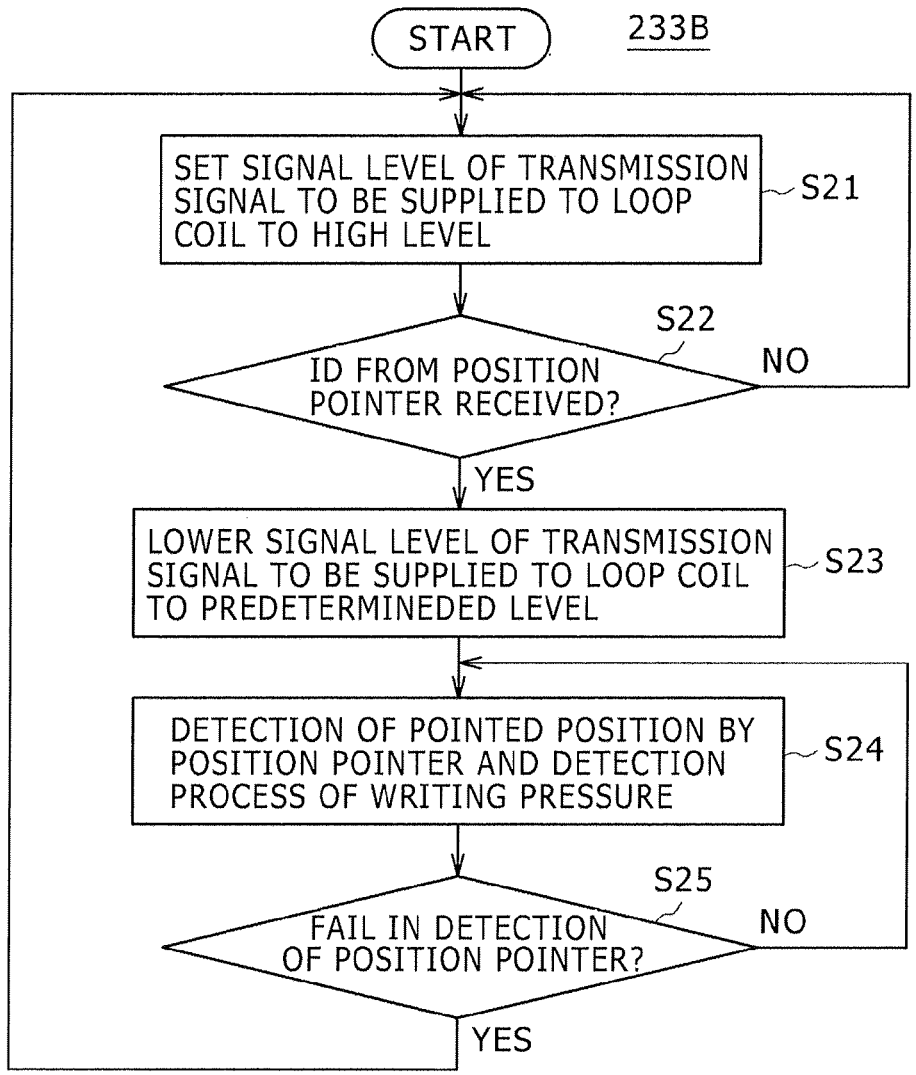
FIG. 16 is a view illustrating a flow chart illustrating processing operation of part of a position detection apparatus which is used together with the position pointer of the embodiment of FIG. 14.

FIG. 16 is a flow chart illustrating processing operation of the processing controlling section 233B of the position detection apparatus 200B. When power is supplied to the position detection apparatus 200B, the processing of FIG. 16 is executed repetitively.

In particular, the processing controlling section 233B first supplies a gain controlling signal for increasing the signal level of a transmission signal to the current driver 222B. Consequently, the AC signal of the frequency f0 from the oscillator 221 is set to a high level by the current driver 222B and supplied to the loop coil groups 211X and 212Y through the selection circuit 213 (step S21 of FIG. 16).

In the position pointer 1B, the electromagnetic induction signal in the form of the AC signal of the high level from the position detection apparatus 200B is received by the parallel resonance circuit 10R. At this time, in response to the high signal level of the AC signal from the position detection apparatus 200B, the switch controlling circuit 306 generates a switch controlling signal for switching on the switch circuit 305 from the AC signal received by the parallel resonance circuit 10R. If the switch circuit 305 is switched on in accordance with the switch controlling signal, then the power Vcc generated by rectifying the AC signal received by the parallel resonance circuit 10R is supplied from the power supply circuit 304 to the IC 301.

When the power supply Vcc is supplied to the IC 301, the IC 301 starts operation. The IC 301 generates an ID signal including a manufacturer's number and a product number of the electronic ink cartridge 10 as a digital signal. The electromagnetic induction signal when the switch circuit 307 is controlled between on and off by the digital signal is transmitted from the position pointer 1B to the position detection apparatus 200B (step S11 of FIG. 15).

In particular, when the switch circuit 307 is off, the parallel resonance circuit 10R can carry out a resonance operation by the AC signal transmitted thereto from the position detection apparatus 200B and send back the electromagnetic signal to the position detection apparatus 200B. The loop coil of the position detection apparatus 200B receives the electromagnetic induction signal from the parallel resonance circuit 10R of the position pointer 1B. On the other hand, when the switch circuit 307 is on, the parallel resonance circuit 10R is placed into a state in which the resonance operation with the AC signal from the position detection apparatus 200B is inhibited. Therefore, the electromagnetic induction signal is not sent back from the parallel resonance circuit 10R to the position detection apparatus 200B, and the loop coil of the position detection apparatus 200B does not receive any signal from the position pointer 1B.

In the present example, the processing controlling section 233B of the position detection apparatus 200B carries out detection of presence or absence of a reception signal from the position pointer 1B repetitively eight times to receive a digital signal of eight bits. In particular, at step S21, the processing controlling section 233B controls the gain of the current driver 222B to establish a state in which the transmission signal is transmitted with the signal level thereof set high, and successively carries out transmission and reception eight times at timings similar to that used in coordinate detection in order to detect the ID signal of eight bits from the position pointer 1B.

On the other hand, the IC 301 of the position pointer 1B generates a digital signal of eight bits corresponding to an ID signal to be transmitted and controls the switch circuit 307 between on and off in synchronism with transmission and reception of the electromagnetic induction signal to and from the position detection apparatus 200B in response to a digital signal of eight bits. For example, when a bit of the ID signal is "1," the switch circuit 307 is switched on. Consequently, as described hereinabove, the electromagnetic induction signal is not sent back from the position pointer 1B to the position detection apparatus 200B as described hereinabove. On the other hand, if the bit of the ID signal is "0," then the switch circuit 307 is switched off. Consequently, the electromagnetic induction signal is sent back from the position pointer 1B to the position detection apparatus 200B as described hereinabove.

Accordingly, the processing controlling section 233B of the position detection apparatus 200B can carry out detection of presence or absence of a reception signal from the position pointer 1B successively eight times to receive an ID signal in the form of a digital signal of eight bits.

The processing controlling section 233B of the position detection apparatus 200B carries out such processing as described above to decide whether or not an ID signal from the position pointer 1B is received (step S22). If the processing controlling section 233B decides that an ID signal has not been able to be received in a predetermined period of time, then the processing returns to step S21 to carry out transmission of a transmission signal of a high level repetitively for a predetermined number of times. It is to be noted that, when an ID signal has not been able to be received even if the processing controlling section 233B carries out the reception process of an ID signal repetitively for the predetermined number of times, the processing controlling section 233B decides that the position pointer 1B does not have a function of transmitting an ID signal. Thus, the processing controlling section 233B skips the reception process of an ID signal.

Then, if it is decided at step S22 that an ID signal is received, then the processing controlling section 233B lowers the gain of the current driver 222B to lower the signal level of the transmission signal to a predetermined level (normal use level) lower than the high level at step S21 (step S23). The predetermined level at this time is a level with which detection of a pointed position and detection of writing pressure by the position pointer 1B can be carried out through cooperation with the parallel resonance circuit 10R of the position pointer 1B while the switch controlling circuit 306 of the position pointer 1B cannot switch on the switch circuit 305.

If the signal level of the electromagnetic induction signal transmitted from the position detection apparatus 200B is set to the predetermined level (normal use state) in this manner, then the switch controlling circuit 306 of the position pointer 1B does not output a switch controlling signal for switching on the switch circuit 305. Therefore, supply of the power Vcc from the power supply circuit 304 to the IC 301 stops, and the IC 301 is disabled. Consequently, the processing of the flow chart of FIG. 15 is ended and the position pointer 1B stops the transmission of the ID signal.

However, the state in which the signal level of the electromagnetic induction signal transmitted from the position detection apparatus 200B is set to the predetermined level (normal use state) is a state quite the same as that in the case of FIG. 9. Therefore, the processing controlling section 233B of the position detection apparatus 200B carries out a process of transmitting and receiving the electromagnetic induction signal to and from the parallel resonance circuit 10R of the position pointer 1B to detect a pointed position and writing pressure by the position pointer 1B in such a manner as described hereinabove in connection with the first embodiment (step S24).

Then, the processing controlling section 233B monitors sending back of the electromagnetic induction signal from the parallel resonance circuit 10R of the position pointer 1B and decides whether or not a state in which the position pointer 1B cannot be detected is established from a reason that sending back of the electromagnetic induction signal disappears (step S25). If it is decided at step S25 that the position pointer 1B has been able to be detected, then the processing controlling section 233B returns the processing to step S24. On the other hand, if it is decided at step S25 that it has become impossible to detect the position pointer 1B, then the processing controlling section 233B returns the processing to step S21. At step S21, a gain controlling signal for setting the signal level of the transmission signal to the high level is supplied to the current driver 222B so that the signal level of the transmission signal to be supplied to the loop coil groups 211X and 212Y is set to the high level. Then, the processing controlling section 233B repeats the processes at the steps beginning with step S21.

With the third embodiment described hereinabove with reference to FIGS. 13A to 16, an ID signal for identifying the position pointer or the electronic ink cartridge can be transmitted from the position pointer to the position detection apparatus. Accordingly, in an electronic apparatus which includes the position detection apparatus, by detecting the ID signal of the position pointer or the electronic ink cartridge, a predetermined process corresponding to the position pointer or the electronic ink cartridge can be allocated. This is very convenient. Further, there is a merit that, by detecting the ID signal of the position pointer or the electronic ink cartridge, also management of the position pointer or the electronic ink cartridge is facilitated.

Besides, if the position detection apparatus starts its operation, then it urges the position pointer to transmit an ID signal provided by the position pointer. If an ID signal is received once, then operation control is carried out such that the ID transmission circuit 300 is electrically disconnected from the resonance circuit of the position pointer and detection of a pointed position and detection of writing pressure by the position pointer are carried out in a normal use state. Further, also when it is decided that an ID signal cannot be received even if the position pointer is urged for a predetermined number of times to transmit an ID signal provided therefor, operation control is carried out such that detection of a pointed position and detection of writing pressure by the position pointer can be carried out in a normal use state. Accordingly, also where a position pointer which does not have a transmission function of an ID signal is used, a special processing operation is unnecessary, and an operation can be carried out free from a sense of discomfort.

It is to be noted that, in the example described above, when an electromagnetic induction signal of the high level from the position detection apparatus 200B is received by the parallel resonance circuit 10R, the switch controlling circuit 306 generates a switch controlling signal for switching on the switch circuit 305 based on the received electromagnetic induction signal of the high level. Then, the power Vcc is supplied to the IC 301 in response to the switch controlling signal.

However, the method by which the switch controlling circuit 306 of the position pointer 1B switches on the switch circuit 305 to supply the power Vcc to the IC 301 is not limited to such a method as described above.

For example, as another example, also it is possible to adopt such a configuration that a predetermined digital signal is sent from the position detection apparatus 200B so that the switch controlling circuit 306 receiving this digital signal generates a switch controlling signal for switching on the switch circuit 305.

In particular, for example, when the position detection apparatus 200B fails to detect the presence of the position pointer 1B because it cannot detect a pointed position by the position pointer 1B, the position detection apparatus 200B transmits the predetermined digital signal as an electromagnetic induction signal through the loop coil groups 211X and 212Y. The parallel resonance circuit 10R of the position pointer 1B receives the electromagnetic induction signal which has a signal envelope corresponding to the digital signal and supplies the received electromagnetic induction signal to the switch controlling circuit 306.

The switch controlling circuit 306, for example, shapes this signal in a waveform shape to carry out an envelope detection of the signal to extract the digital signal. Then, the switch controlling circuit 306 generates a switch controlling signal for switching on the switch circuit 305 when the digital signal coincides with a digital signal set in advance. The power Vcc is supplied to the IC 301 in accordance with the switch controlling signal.

The IC 301 starts operation in response to turning on of the power supply Vcc and sends an ID signal of the position pointer 1B to the position detection apparatus 200B through the parallel resonance circuit 10R. When the ID signal is received, the position detection apparatus 200B stops the transmitting of the predetermined digital signal and changes the operation mode from the ID signal detection mode to the normal use mode in which a pointed position by the position pointer 1B is detected so that a detection operation of the pointed position by the position pointer 1B is carried out. If it has become impossible to detect the predetermined digital signal, then the switch controlling circuit 306 switches off the switch circuit 305 to stop the supply of the power Vcc to the IC 301. Consequently, the transmitting of the ID signal is stopped, and the ID transmission circuit 300 is placed into a high impedance state, in which the ID transmission circuit 300 is electrically disconnected from the connector 199.

It is to be noted that, when the position pointer 1B cannot be detected any more, the position detection apparatus 200B starts transmitting of the predetermined digital signal again.

Fourth Embodiment

This forth embodiment is a modification to the third embodiment. In particular, in the third embodiment described hereinabove, the connector 199 for connection to the ID transmission circuit 300 is provided on the cap 19B. However, in the present fourth embodiment, the ID transmission circuit 300 is configured so as to be disposed in a cylindrical member of an electronic ink cartridge. The fourth embodiment described below is an example in the case where the ID transmission circuit 300 is built in an electronic ink cartridge 20A having a configuration similar to that in the second embodiment described hereinabove.

Figures 17A, 17B:
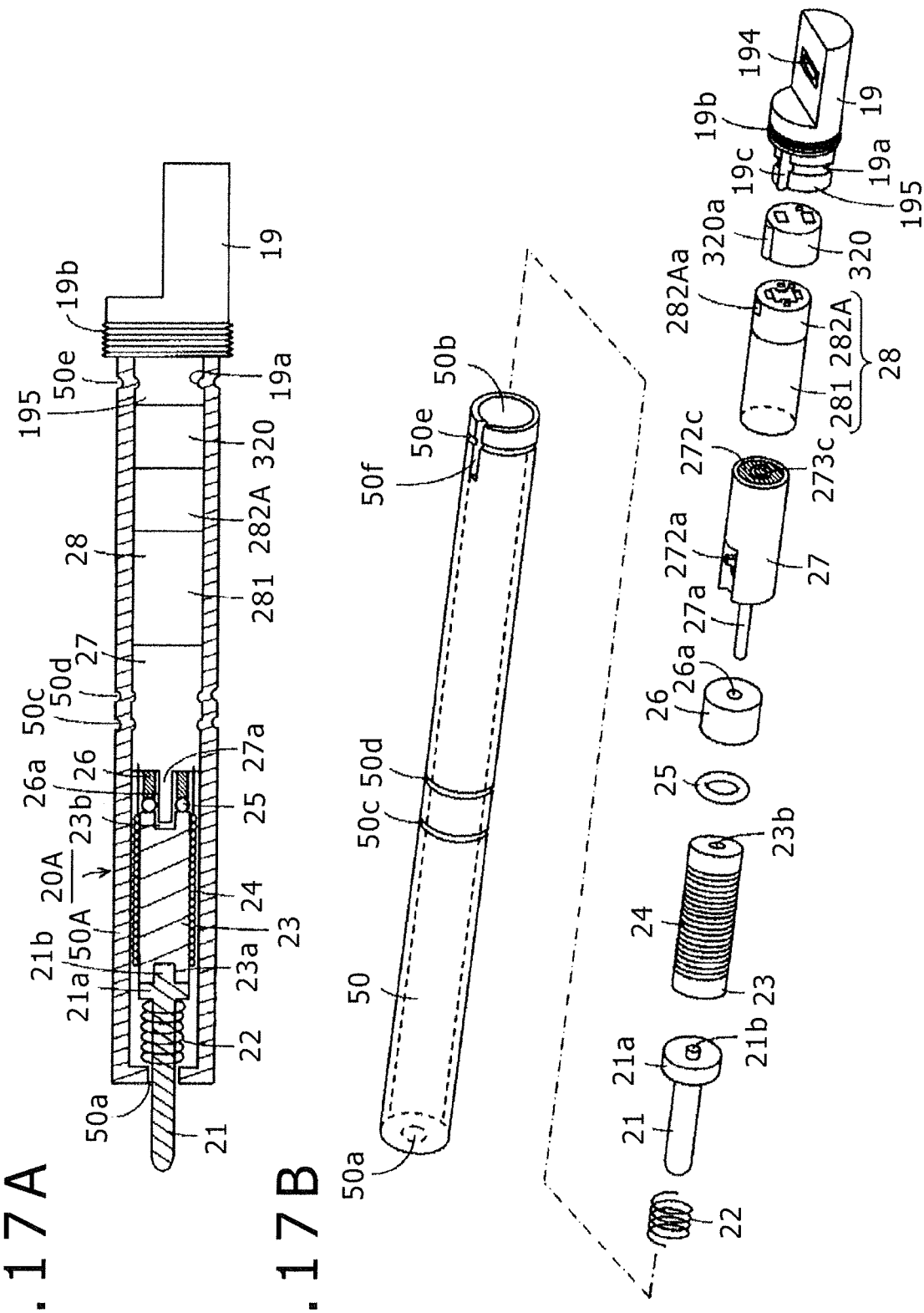
FIGS. 17A and 17B are views illustrating an example of a configuration of an electronic ink cartridge for a position pointer according a fourth embodiment of the present invention.

FIGS. 17A and 17B are views illustrating an example of a configuration of the electronic ink cartridge 20A of the position pointer of the present fourth embodiment. In FIGS. 17A and 17B, like elements to those of the electronic ink cartridge 20 in the second embodiment illustrated in FIGS. 10A and 10B are denoted by like reference characters, and a detailed description of them is omitted.

In the present fourth embodiment, an ID package 320 of a cylindrical shape having the ID transmission circuit 300 built therein is prepared. A tubular member 50A in the present fourth embodiment is longer by a length of the ID package 320 in the direction of the center axis than the tubular member 50 in the second embodiment.

The ID package 320 is disposed between a second capacitor circuit 282A, which configures the capacitor circuit 28, and the cap 19 juxtaposed in the direction of the center axis in the hollow portion of the tubular member 50A as illustrated in FIGS. 17A and 17B. It is to be noted that the second capacitor circuit 282A has a configuration similar to that of the second capacitor circuit 182 illustrated in FIGS. 6A-6D except the configuration of the coupling portion thereof to the ID package 320.

FIGS. 18A-18C show an example of a configuration of the ID package 320, and FIG. 18A is a view of the ID package 320 as viewed from the second capacitor circuit 282A side which configures the capacitor circuit 28. Meanwhile, FIG. 18B is a sectional view taken along line I-I of FIG. 18A. Further, FIG. 18C is a view of the ID package 320 as viewed from the cap 19 side.

The ID package 320 includes an ID transmission circuit 300 accommodated in a package 321 formed from a cylindrical resin material and has two terminal members 322 and 323 to which the two terminals described hereinabove of the ID transmission circuit 300 are connected. Further, a protrusion 320a is formed on a peripheral portion of the ID package 320 such that it extends along the direction of the center axis and engages with a groove 50f which is formed on the tubular member 50A on the opening 50b side and extends in the axial direction. Further, in the ID package 320, the second capacitor circuit 282A has a penetrating terminal member 324 for electrically connecting the terminal member 1825 extending therethrough between the opposite end faces thereof in the direction of the center axis and the terminal member 193 on the end face of the cap 19 illustrated in FIGS. 7A-7C, similarly to the second capacitor circuit 282 illustrated in FIGS. 6A-6D.

On the end face of the second capacitor circuit 282A on the ID package 320 side, the second end 1824b of the terminal member 1824, second end 1826b of the terminal member 1826 and second end 1825b of the terminal member 1825 are exposed as illustrated in FIG. 19 similarly as in FIG. 6C. However, in the present fourth embodiment, on the end face of the second capacitor circuit 282A on the ID package 320 side, fitting recessed holes 2821 and 2822 similar to the fitting recessed holes 1816 and 1817 (refer to FIG. 6D) formed on the end face of the first capacitor circuit 181 illustrated in FIG. 5C opposing the second capacitor circuit 282 side are formed.

Further, as illustrated in FIG. 18A, on the end face of the ID package 320 on the second capacitor circuit 282A side, a first end 322a of the terminal member 322, a first end 323a of the terminal member 323 and first end 324a of the terminal member 324 are exposed so as to be abutted by the second end 1824b of the terminal member 1824, second end 1826b of the terminal member 1826 and second end 1825b of the terminal member 1825 formed on the end face of the second capacitor circuit 282A illustrated in FIG. 19 on the ID package 320 side, respectively.

Further, as illustrated in A and FIG. 18B, fitting protrusions 3251 and 3252 are formed on the end face of the ID package 320 on the second capacitor circuit 282A side for fitting with the fitting recessed holes 2821 and 2822 formed on the end face of the second capacitor circuit 282A illustrated in FIG. 19 on the ID package 320 side.

Further, as illustrated in FIG. 18C, a second end 322b of the terminal member 322, a second end 323b of the terminal member 323 and a second end 324b of the terminal member 324 are exposed to the end face of the IC package 320 on the cap 19 side.

In the present fourth embodiment, the capacitor circuit 28 including the second capacitor circuit 282A is accommodated into the tubular member 50A similarly as in the second embodiment described hereinabove. Then, the ID package 320 is inserted into the tubular member 50A in such a manner that the fitting protrusions 3251 and 3252 thereof are fitted into the fitting recessed holes 1816 and 1817 of the second capacitor circuit 282A, respectively.

At this time, a protrusion 282Aa of the second capacitor circuit 282A and the protrusion 320a of the ID package 320 are fitted into the groove 50f of the tubular member 50A to position them in the circumferential direction. Consequently, the second end 1824b of the terminal member 1824, second end 1826b of the terminal member 1826 and second end 1825b of the terminal member 1825 on the end face of the second capacitor circuit 282A are abutted with and electrically connected to the second end 322b of the terminal member 322, second end 323b of the terminal member 323 and second end 324b of the terminal member 324 of the ID package 320, respectively.

Thereafter, although the length of the reduced diameter portion 195 in the direction of the center axis is adjusted in accordance with the thickness of the ID package 320 in the direction of the center axis, the configuration for inserting the reduced diameter portion 195 of the cap 19 into the tubular member 50A to fix the cap 19 to the tubular member 50A is similar to that in the second embodiment described hereinabove.

In the electronic ink cartridge 20A of the present fourth embodiment, as the ID package 320 is accommodated into the tubular member 50A in such a manner as described above, the ID transmission circuit 300 is placed into a state in which it is connected in parallel between the opposite ends of the coil 22. In other words, the ID package 320 is connected in parallel to the coil 22 and the first capacitor circuit 281 without the intervention of the connector 199 described hereinabove with reference to FIG. 14.

Accordingly, also in the present fourth embodiment, the position detection apparatus 200B described hereinabove in connection with the third embodiment can recognize identification of the electronic ink cartridge 20A from an electromagnetic induction signal from the electronic ink cartridge 20A.

In the present fourth embodiment, since the configuration wherein the ID package 320 having the ID transmission circuit 300 built therein is accommodated in the tubular member 50A is adopted, the ID transmission circuit 300 need not be connected to the electronic ink cartridge 10B later, differently from the third embodiment.

It is to be noted that, since it is sufficient to connect the ID transmission circuit 300 in parallel to the coil 22, it is not necessary to provide the ID package 320 between the capacitor circuit 28 and the cap 19. For example, the ID transmission circuit 300 may be provided between the connection member 27 and the capacitor circuit 28.

Other Embodiments

In the first embodiment described hereinabove, the core member 11 is configured from a resin material and configured for coupling to the ferrite chip 13. However, the configuration of the core member 11 is not limited to this but can be configured, for example, in such a manner as illustrated in FIG. 20A, 20B, or 20C.

Figure 20A:
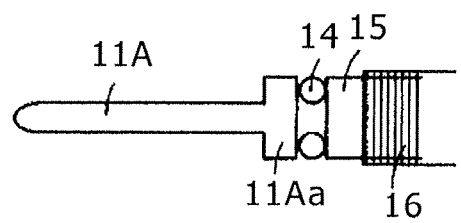
FIGS. 20A-20F are views illustrating an example of a configuration of part of an electronic ink cartridge according to a different embodiment.

In particular, in the example of FIG. 20A, a core member 11A is configured from a magnetic material, and an O ring 14 is provided between a flange portion 11Aa of the core member 11A and an end face of a ferrite core 15 on which a coil 16 is wound. According to the example of FIG. 20A, since the core member 11A plays a role of a second magnetic member, the necessity for the ferrite chip 13 used in the first embodiment is eliminated, and the configuration is simplified as much.

Figure 20B:
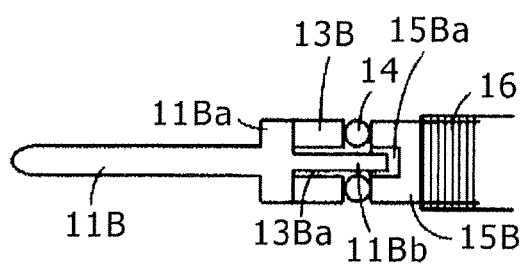
Figure 20C:
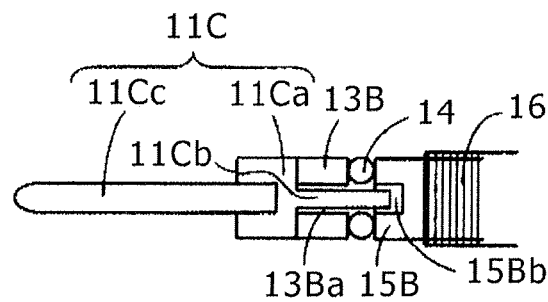

In the example of FIG. 20B, a ferrite chip 13B having a through-hole 13Ba is used. A core member 11B is configured from a resin material, and a rod-like protrusion 11Bb is formed at a central portion of an end face of a flange portion 11Ba. Further, a recessed portion 15Ba into which a distal end portion of the rod-like protrusion 11Bb is to be inserted is provided on an end face of the ferrite core 15B.

The rod-like protrusion 11Bb of the core member 11B penetrates the through-hole 13Ba of the ferrite chip 13B and further penetrates the O ring 14 until it is inserted into the recessed portion 15Ba on the end face of the ferrite core 15B. In this instance, the length of the rod-like protrusion 11Bb of the core member 11B is set such that, when the core member 11B is acted upon by pressing force, the ferrite chip 13B is displaced toward the ferrite core 15B side through the O ring 14. According to the example of FIG. 20B, since the rod-like protrusion 11Bb extends through the through-hole 13Ba of the ferrite chip 13B and the O ring 14, there is an effect that the position of them in a direction perpendicular to the direction of the center axis is restricted.

The example of FIG. 20C has a configuration equivalent to the configuration of the example of FIG. 20B in which the distal end portion of the core member is removably mounted on the flange portion of the core member. In particular, in the example of FIG. 20C, the core member 11C is configured from a flange portion 11Ca on which a rod-like protrusion 11Cb is formed and a core member distal end portion 11Cc removably mounted on the flange portion 11Ca. According to the example of FIG. 20C, there is an effect that the core member distal end portion 11Cc can be exchanged arbitrarily.

Figure 20D:
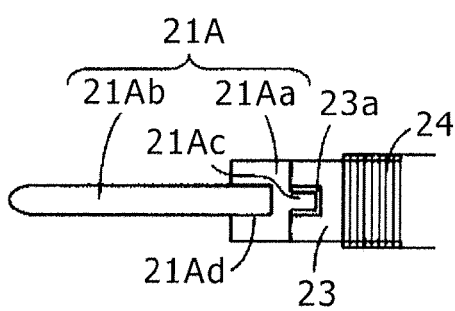
Figure 20E:
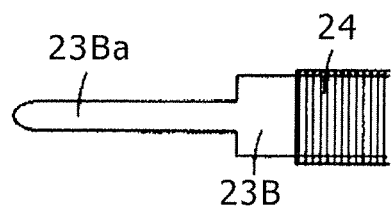

Moreover, in regard to the second embodiment, the configuration of the portion including the core member 21 and the ferrite core 23 is not limited to that of the example described hereinabove but can be configured, for example, in such a manner as illustrated in FIGS. 20D and 20E.

The example of FIG. 20D corresponds to a case in which the distal end portion of the core member in the second embodiment is removably mounted on the flange portion of the core member such that the distal end portion of the core member can be exchanged. In particular, in the example of FIG. 20D, the core member 21A includes a flange portion 21Aa and a core member distal end portion 21Ab configured as a separate member from the flange portion 21Aa and removably mounted on the flange portion 21Aa. Further, a protrusion 21Ac for fitting into the recessed portion 23a of the ferrite core 23 is formed on the flange portion 21Aa so as to be fitted with the ferrite core 23. Further, a recessed portion 21Ad for removably fitting with the core member distal end portion 21Ab is formed on the flange portion 21Aa. The core member distal end portion 21Ab is removable by fitting in the recessed portion 21Ad of the flange portion 21Aa. According to the example of FIG. 20D, there is an effect that the core member distal end portion 21Ab can be exchanged arbitrarily.

In the example of FIG. 20E, a protrusion serving as a core member 22Ba is formed on the ferrite core 23B in the second embodiment. In the example of FIG. 20E, there is no necessity to provide the core member separately.

Figure 20F:
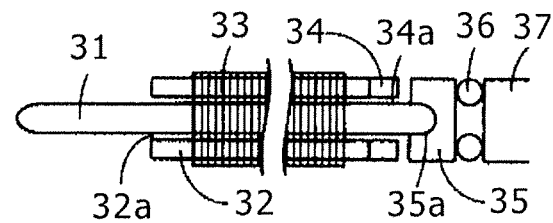

FIG. 20F is a view illustrating a different example of a configuration wherein the distance between the first magnetic member and the second magnetic member is varied in response to pressing force applied to the core member thereby to vary the inductance of the coil wound on the first magnetic member. In the present example, a through-hole 32a is formed in a ferrite core 32 on which a coil 33 is wound such that a core member 31 made of, for example, a resin material is fitted. On the opposite side, to the distal end portion side of the core member 31, of the ferrite core 32 fixed to a tubular member, a ferrite chip 35 as an example of the second magnetic member is provided through an elastic member 34 of rubber or the like which has a through-hole 34a in which the core member 31 is fitted. On the ferrite chip 35, a recessed hole 35a is formed such that an end portion of the core member 31, which extends through the ferrite core 32 and the elastic member 34, on the opposite side to the distal end portion is fitted. Between the ferrite chip 35 and a predetermined member 37 which is fixed at a position in the direction of the center axis, an elastic member such as an O ring 36 which is, for example, an elastic member is provided.

According to the configuration of FIG. 20F, when pressing force in the direction of the center axis is applied to the distal end side of the core member 31, the ferrite chip 35 pushes the O ring 36 to displace in the direction of the center axis to vary the distance to the ferrite core 32. The inductance of the coil 33 varies in response to the variation of the distance.

Other Embodiments and Modifications

As described above, the electronic ink cartridge of the present invention can be handled similarly to an ink cartridge (refill lead) which is accommodated in a housing like a ballpoint pen of a writing instrument. A ballpoint pen of the knock type or the rotary type is known wherein the ink cartridge is changed over between a state in which the pen tip is accommodated in the housing and another state in which the pin tip projects outwardly from the housing. Moreover, a ballpoint pen is known which has a structure for changing over a plurality of ink cartridges, for example, for different colors such that the pen tip thereof is projected from the housing.

Hence, the position pointer of the present invention can be configured in a structure of the knock type or the rotary type for changing over an electronic ink cartridge between a state in which the core member is accommodated in the housing and another state in which the core member projects outwardly of the housing. Further, also it is possible for the position pointer of the present invention to adopt a configuration wherein changeover between a plurality of electronic ink cartridges which are different in thickness of the core member is carried out or changeover between an ink cartridge of a ballpoint pen and an electronic ink cartridge is carried out.

It is to be noted that each of the capacitor circuits 18 and 28 of the first and second embodiments described hereinabove is configured such that a plurality of multilayer ceramic capacitors are stacked to provide a plurality of capacitors connected in parallel to each other and the capacitance of the capacitor circuit 18 is adjusted by the number of stacked multilayer ceramic capacitors. However, it is a matter of course that the configuration of the capacitor circuits 18 and 28 is not limited to this example. For example, also it is possible to apply a capacitor proposed in Japanese Patent Application No. 2012-128834 by the applicant of the present patent application to the capacitor circuits 18 and 28.

Further, while, in the embodiments described hereinabove, an O ring made of elastic material is used for the elastic member as means for changing the distance between the first magnetic member and the second magnetic member in response to the pressing force applied to the core member in order to vary the inductance of the coil, the elastic member is not limited to this. For example, a member of a predetermined shape formed from a coil spring or made of rubber or a combination of such members may be used.

It is to be noted that, while, in the third and fourth embodiments described hereinabove, identification information is taken as an example of information relating to an electronic ink cartridge, the information relating to an electronic ink cartridge is not limited to the identification information, but various kinds of information can be applied.

DESCRIPTION OF REFERENCE NUMERALS

1 . . . Position pointer, 2 . . . Housing, 5 . . . Tubular member, 7 . . . Push switch, 10, 20 . . . Electronic ink cartridge, 11, 21 . . . Core member, 13, 26 . . . Ferrite chip (second magnetic member), 14, 25 . . . O ring, 15, 23 . . . Ferrite core (first magnetic member), 16, 24 . . . Coil, 17, 27 . . . Connection member, 18, 28 . . . Capacitor circuit, 19, 29 . . . Cap

The invention claimed is:

1. An electronic ink cartridge of an electromagnetic induction type, the electronic ink cartridge being structured to be replaceably inserted in a pen-shaped position pointer that electromagnetically indicates a position on a sensor surface, the electronic ink cartridge comprising:
   a tubular member structured to be replaceably inserted in a cylindrical housing of the pen-shaped position pointer,
   a core member partially housed in the tubular member and extended out from a distal end of the tubular member,
   a resonance circuit housed inside the tubular member, the resonance circuit having a coil, whose inductance varies in response to pressure applied to the core member, and a capacitor circuit, which has predetermined capacitance and which is connected in parallel to the coil, the electronic ink cartridge being configured to detect the pressure applied to the core member based on a variation of a resonance frequency of the resonance circuit, and the coil being positioned between the core member and the capacitor circuit along a direction of a center axis of the tubular member,
   a connection member accommodated in the tubular member between the coil and the capacitor circuit, the connection member having a generally cylindrical shape including two axial end surfaces and a peripheral side surface defined between the two axial end surfaces, and
   two connection terminals that electrically connect a first end and a second end of the coil to a first terminal and a second terminal of the capacitor circuit, respectively,
   wherein the peripheral side surface of the connection member defines at least one recessed portion, at which the first end and the second end of the coil are electrically connected with the two connection terminals, respectively.

2. The electronic ink cartridge of the electromagnetic induction type according to claim 1, wherein
   a protrusion portion and a recessed portion corresponding to the protrusion portion are formed in an interface area between an interior face of the tubular member and the connection member such that the connection member is engaged with the tubular member to withstand the pressure applied to the core member.

3. The electronic ink cartridge of the electromagnetic induction type according to claim 2, wherein
   the tubular member is formed of a first tubular member and a second tubular member, which are arranged along the direction of the center axis of the tubular member and are connected to each other, and the core member extends outwardly from a first end of the first tubular member and the connection member is positioned adjacent to a second end of the first tubular member.

4. The electronic ink cartridge of the electromagnetic induction type according to claim 1, wherein
   the coil is wound around a first magnetic member while a second magnetic member is disposed to oppose the first magnetic member along the direction of the center axis of the tubular member, such that a distance between the first magnetic member and the second magnetic member varies in accordance with the pressure applied to the core member to thereby vary the inductance of the coil.

5. The electronic ink cartridge of the electromagnetic induction type according to claim 4, wherein
the first magnetic member around which the coil is wound is disposed closer to the distal end of the tubular member, from which the core member extends outwardly, than the second magnetic member.

6. The electronic ink cartridge of the electromagnetic induction type according to claim 4, wherein
the second magnetic member is disposed closer to the distal end of the tubular member, from which the core member extends outwardly, than the first magnetic member.

7. The electronic ink cartridge of the electromagnetic induction type according to claim 1, wherein
a biasing member configured to bias the core member in a direction opposite to a direction in which the core member extends outwardly along the center axis is disposed inside the tubular member near the distal end thereof, from which the core member extends outwardly.

8. The electronic ink cartridge of the electromagnetic induction type according to claim 1, wherein
the core member has a rod shape and exchangeably extends from the tubular member.

9. The electronic ink cartridge of the electromagnetic induction type according to claim 1, wherein
a first one of the connection terminals is formed in a protrusion shape or a recessed shape at a central portion of one axial end surface of the connection member facing the capacitor circuit while a second one of the connection terminals is formed at a peripheral portion of said one axial end surface.

10. The electronic ink cartridge of the electromagnetic induction type according to claim 1, wherein
an information transmission circuit having information relating to the electronic ink cartridge is connected in parallel to the resonance circuit.

11. The electronic ink cartridge of the electromagnetic induction type according to claim 10, wherein
transmission of the information from the information transmission circuit is controlled based on a signal supplied via the resonance circuit.

12. The electronic ink cartridge of the electromagnetic induction type according to claim 1, wherein
the capacitor circuit includes a first capacitor circuit and a second capacitor circuit configured to set a first resonance frequency and a second resonance frequency, respectively, wherein the second resonance frequency is different from the first resonance frequency.

13. The electronic ink cartridge of the electromagnetic induction type according to claim 12, wherein
the capacitor circuit has a cylindrical shape, and a first terminal and a second terminal of the first capacitor circuit are exposed on a first end face of the capacitor circuit that opposes one axial end surface of the connection member, and
a first terminal and a second terminal of the second capacitor circuit are exposed on a second end face of the capacitor circuit opposite from said first end face, wherein the first terminal of the second capacitor circuit is connected to the first terminal of the first capacitor circuit while the second terminal of the second capacitor circuit is connected via a switch circuit to the second terminal of the first capacitor circuit, the second terminal of the first circuit being also exposed on said second end face of the capacitor circuit.

14. A pen-shaped position pointer comprising:
a) a cylindrical housing; and
b) an electronic ink cartridge of an electromagnetic induction type replaceably inserted inside the cylindrical housing, the electronic ink cartridge including:
(i) a tubular member structured to be replaceably inserted in the cylindrical housing;
(ii) a core member partially housed in the tubular member and extended out from a distal end of the tubular member;
(iii) a resonance circuit housed inside the tubular member, the resonance circuit including a coil, whose inductance varies in response to pressure applied to the core member, and a capacitor circuit, which has predetermined capacitance and which is connected in parallel to the coil, the coil being positioned between the core member and the capacitor circuit along a direction of a center axis of the tubular member;
(iv) a connection member accommodated in the tubular member between the coil and the capacitor circuit, the connection member having a generally cylindrical shape including two axial end surfaces and a peripheral side surface defined between the two axial end surfaces; and
(v) two connection terminals that electrically connect a first end and a second end of the coil to a first terminal and a second terminal of the capacitor circuit, respectively,
wherein the peripheral side surface of the connection member defines at least one recessed portion, at which the first end and the second end of the coil are electrically connected with the two connection terminals, respectively.

15. The position pointer according to claim 14, wherein
the core member, which in a default state extends outwardly from the distal end of the tubular member, is retractable to be accommodated completely in the position pointer.

16. The position pointer according to claim 14, further comprising a switch circuit provided in the cylindrical housing of the position pointer, wherein
the capacitor circuit includes a first capacitor circuit and a second capacitor circuit configured to set a first resonance frequency and a second resonance frequency, respectively, the second resonance frequency being different from the first resonance frequency,
a first terminal and a second terminal of the first capacitor circuit are exposed on a first end face of the capacitor circuit that opposes one axial end surface of the connection member to be electrically connected to the coil through the connection member,
a first terminal and a second terminal of the second capacitor circuit are exposed on a second end face of the capacitor circuit opposite from said first end face, and
the first terminal of the second capacitor circuit is connected to the first terminal of the first capacitor circuit while the second terminal of the second capacitor circuit is connected via the switch circuit to the second terminal of the first capacitor circuit.

* * * * *